US010535369B2

(12) United States Patent
Takahashi et al.

(10) Patent No.: US 10,535,369 B2
(45) Date of Patent: Jan. 14, 2020

(54) INFORMATION PROCESSING DEVICE, INFORMATION GENERATION DEVICE, INFORMATION RECORDING MEDIUM, INFORMATION PROCESSING METHOD, AND PROGRAM

(71) Applicant: SONY CORPORATION, Tokyo (JP)

(72) Inventors: Ryohei Takahashi, Kanagawa (JP); Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 111 days.

(21) Appl. No.: 15/127,568

(22) PCT Filed: Apr. 7, 2015

(86) PCT No.: PCT/JP2015/060854
§ 371 (c)(1),
(2) Date: Sep. 20, 2016

(87) PCT Pub. No.: WO2015/178112
PCT Pub. Date: Nov. 26, 2015

(65) Prior Publication Data
US 2017/0148483 A1 May 25, 2017

(30) Foreign Application Priority Data
May 19, 2014 (JP) .................................. 2014-103141

(51) Int. Cl.
G11B 20/12 (2006.01)
H04N 21/4402 (2011.01)
(Continued)

(52) U.S. Cl.
CPC .......... G11B 20/1217 (2013.01); H04N 9/80 (2013.01); H04N 21/440218 (2013.01); H04N 21/8451 (2013.01)

(58) Field of Classification Search
CPC .................................................. G11B 20/1217
(Continued)

(56) References Cited

U.S. PATENT DOCUMENTS

2005/0169303 A1* 8/2005 Toma ........................ H04N 7/52
370/466
2006/0165381 A1* 7/2006 Eckleder .............. G11B 27/105
386/330
2013/0298171 A1 11/2013 Takeda et al.

FOREIGN PATENT DOCUMENTS

EP 3094083 A1 11/2016
JP 2001-086481 3/2001
(Continued)

OTHER PUBLICATIONS

Yoshinori Matsui, Common NAL Packet Structure, Matsushita Electric INdustrial Co. LTD, May 6, 2002 (Year: 2002).*
(Continued)

Primary Examiner — William C Vaughn, Jr.
Assistant Examiner — Daniel T Tekle
(74) Attorney, Agent, or Firm — Paratus Law Group, PLLC

(57) ABSTRACT

It is possible to accurately and securely execute conversion from an MPEG-2TS format to an MP4 format. A data converting unit that executes format conversion from an MPEG-2TS format to an MP4 format sorts out TS packets storing video data from MPEG-2TS format data, selects a TS packet having a start code (SC) at the top of a payload on the basis of header information of the sorted out TS packets, and extracts payload configuration data other than the start code (SC) and sets the payload configuration data as configuration data of MP4 format data. The data converting unit determines, on the basis of, for example, a value of a transport priority set in a header of the TS packet, whether
(Continued)

or not the TS packet is a TS packet in which a start code (SC) is set in a top region of a payload.

18 Claims, 20 Drawing Sheets

(51) Int. Cl.
*H04N 21/845* (2011.01)
*H04N 9/80* (2006.01)

(58) Field of Classification Search
USPC .......................................................... 386/248
See application file for complete search history.

(56) References Cited

FOREIGN PATENT DOCUMENTS

| JP | 2001-103444 | 4/2001 |
|---|---|---|
| JP | 2005-229587 | 8/2005 |
| JP | 2008-098765 | 4/2008 |
| JP | 2011-222078 | 11/2011 |
| JP | 2012-004986 | 1/2012 |
| WO | WO2014/057832 A1 | 4/2014 |

OTHER PUBLICATIONS

Nov. 24, 2017, European Search Report issued for related EP application No. 15796584.9.

Sridhar et al., Multiplexing and Demultiplexing of AVS China Video with AAC Audio, Telecommunication in Modern Satellite Cable and Broadcasting Services (TELSIKS), Oct. 5-8, 2011, pp. 84-91, 10th International Conference, IEEE, Nis, Serbia.

Matsui, Common NAL Packet Structure, Joint Video Team (JVT) of ISO/IEC MPEG & ITU-T VCEG (ISO/IEC JTC1/SC29/WG11 and ITU-T SG16 Q.6), May 6-10, 2002, pp. 1-8, $3^{rd}$ Meeting, Fairfax, Virginia.

Sep. 4, 2018, Japanese Office Action issued for related JP application No. 2016-520993.

* cited by examiner

FIG. 4
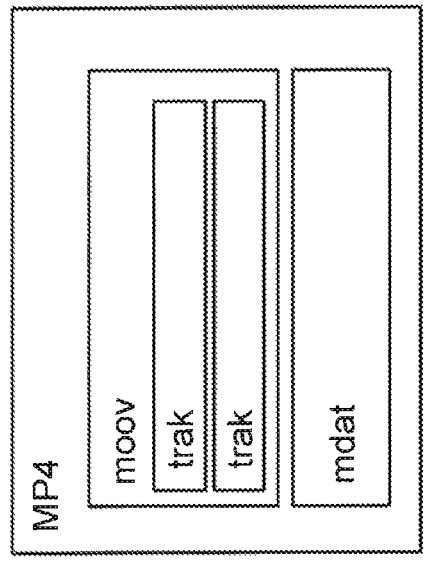
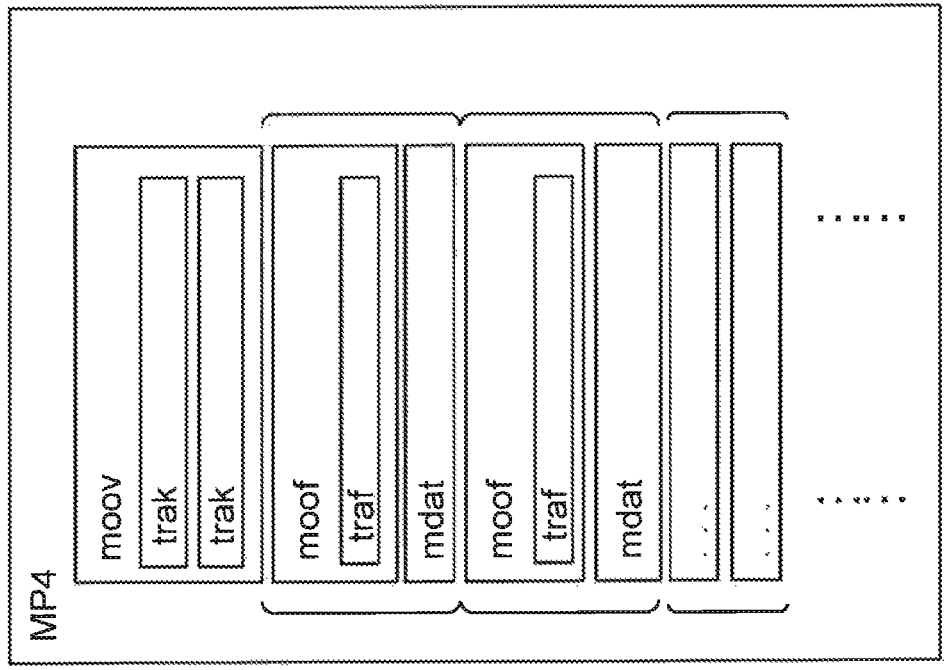

FIG. 7

(1) MPEG-2TS (=BYTE STREAM FORMAT (byte stream format))

| Start code | NAL unit | Start code | NAL unit | Start code | NAL unit | ... | Start code | NAL unit |

(2) MP4 (=SAMPLE STRUCTURE (sample structure))

| Length | NAL unit | Length | NAL unit | Length | NAL unit | ... | Length | NAL unit |

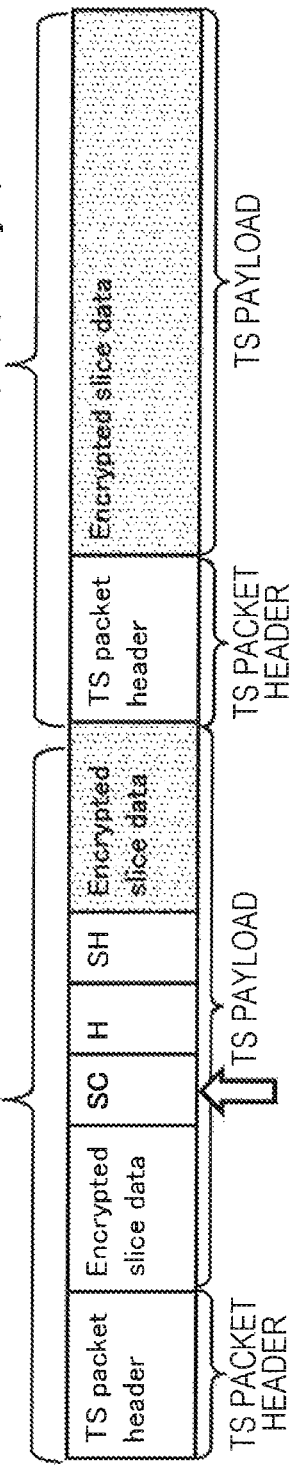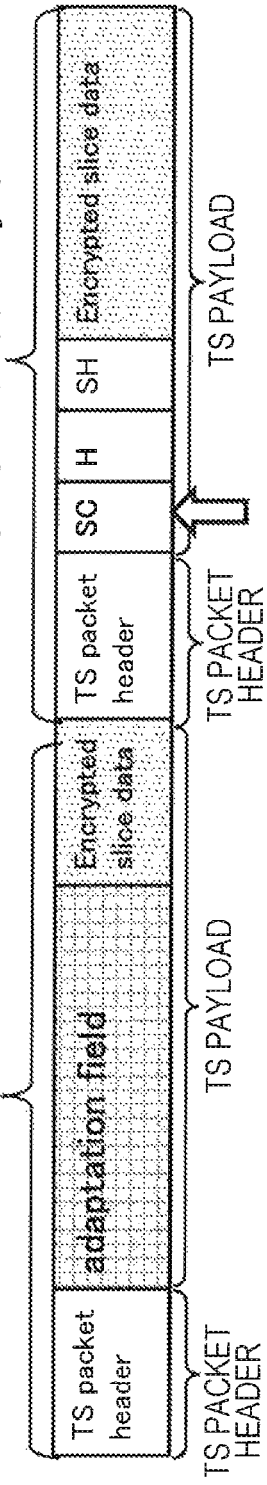
FIG. 14
(1) ADAPTATION FIELD (adaptation_filed) DOES NOT EXIST
(2) ADAPTATION FIELD (adaptation_filed) EXISTS

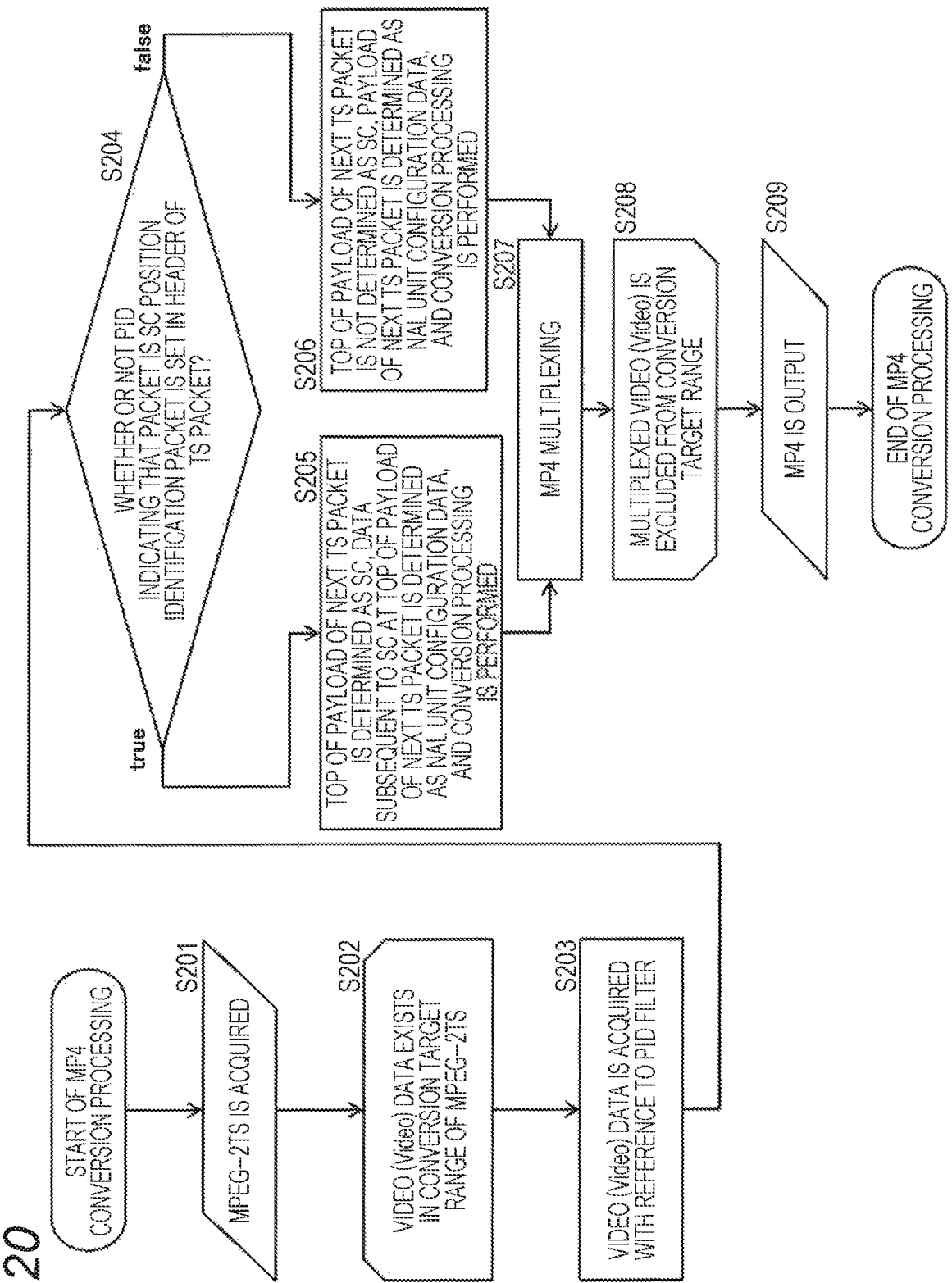

INFORMATION PROCESSING DEVICE, INFORMATION GENERATION DEVICE, INFORMATION RECORDING MEDIUM, INFORMATION PROCESSING METHOD, AND PROGRAM

CROSS REFERENCE TO PRIOR APPLICATION

This application is a National Stage Patent Application of PCT International Patent Application No. PCT/JP2015/060854 (filed on Apr. 7, 2015) under 35 U.S.C. § 371, which claims priority to Japanese Patent Application No. 2014-103141 (filed on May 19, 2014), which are all hereby incorporated by reference in their entirety.

TECHNICAL FIELD

The present disclosure relates to an information processing device, an information generation device, an information recording medium, an information processing method, and a program. More specifically, the present disclosure relates to an information processing device, an information generation device, an information recording medium, an information processing method, and a program capable of securely executing, for example, format conversion processing.

BACKGROUND ART

Digital versatile discs (DVDs) and Blu-ray (registered trademark) discs (BDs) are frequently used as information recording media for recording various contents such as movies and music.

In those discs, various types of data, such as video, audio, and reproduction control data, are recorded in a data recording format prescribed in advance.

For example, a Blu-ray (registered trademark) disc movie (BDMV) format is used as a data recording format for BDs.

In order to reproduce record data in the BDMV format, it is necessary to have a program for reproducing BDMV format data.

Recently, there have increased users who view contents such as movies on portable terminals such as a smartphone and a tablet terminal.

Not all the portable terminals have a reproduction application compatible to the BDMV format. Therefore, in the case where record data in a BD is copied to a medium of a portable terminal, it is necessary to convert a format thereof to a format other than the BDMV format, which is reproducible by a reproduction application of the portable terminal, to record a content.

Note that data copy processing between media is disclosed in, for example, Patent Document 1 (Japanese Patent Application Laid-Open No. 2008-98765) and Patent Document 2 (Japanese Patent Application Laid-Open No. 2011-222078).

As a data recording format standardized in consideration of the use of data with a portable terminal or the like, there is an MP4 format (hereinafter, referred to as MP4).

Many portable terminals have a reproduction application capable of reproducing MP4 data recorded in the MP4 format, and therefore, in the case where a content is recorded on a medium of a portable terminal, the content needs to be recorded in the MP4 format.

Therefore, for example, in the case where data in the BDMV format is copied to a medium such as an SD card for use in a portable terminal, it is necessary to perform copy processing including format conversion from the BDMV to the MP4.

However, there is no specific proposal for this format conversion at present. In the case where format conversion is not securely performed, a content may not be reproduced in a destination to which the content is copied.

CITATION LIST

Patent Document

Patent Document 1: Japanese Patent Application Laid-Open No. 2008-98765
Patent Document 2: Japanese Patent Application Laid-Open No. 2011-222078

SUMMARY OF THE INVENTION

Problems to be Solved by the Invention

The present disclosure has been made in view of the above problems, and an object of the invention is to provide an information processing device, an information generation device, an information recording medium, an information processing method, and a program capable of normally reproducing data after format conversion in a configuration in which, for example, data recording processing including format conversion is performed.

Solutions to Problems

A first aspect of the present disclosure is an information processing device, including
a data converting unit configured to execute format conversion from an MPEG-2TS format to an MP4 format, wherein
the data converting unit includes
a data analysis unit configured to sort out TS packets storing video data from MPEG-2TS format data, and
a video data converting unit configured to execute processing of selecting a TS packet having a start code (SC) at a top of a payload on the basis of header information of the TS packets sorted out in the data analysis unit, extracting payload configuration data other than the start code (SC), and setting the payload configuration data as configuration data of MP4 format data.

Furthermore, a second aspect of the present disclosure is an information generation device, including
a data generation unit configured to generate MPEG-2TS format data, wherein
the data generation unit generates a TS packet in which start code position identification information indicating whether or not the packet is a packet having a start code (SC) at a top of a TS payload is recorded as header information of the TS packet storing video data.

Furthermore, a third aspect of the present disclosure is an information recording medium on which MPEG-2TS format data is recorded as data to be reproduced, wherein:
a TS packet, in which start code position identification information indicating whether or not the packet is a packet having a start code (SC) at a top of a TS payload is recorded as header information of the TS packet storing video data, is recorded; and
an information processing device configured to execute format conversion of storage data in the information recording medium analyzes the header information of the TS packet to determine a position of a start code (SC) and performs format conversion based on a result of the determination.

Furthermore, a fourth aspect of the present disclosure is an information processing method for executing data format conversion in an information processing device, wherein:

the information processing device includes a data converting unit configured to execute format conversion from an MPEG-2TS format to an MP4 format; and the data converting unit executes processing of sorting out TS packets storing video data from MPEG-2TS format data, selecting a TS packet having a start code (SC) at a top of a payload on the basis of header information of the sorted out TS packets, and extracting payload configuration data other than the start code (SC) and setting the payload configuration data as configuration data of MP4 format data.

Furthermore, a fifth aspect of the present disclosure is an information processing method for executing data generation processing in an information processing device, wherein:

the information processing device includes a data generation unit configured to generate MPEG-2TS format data; and the data generation unit generates a TS packet in which start code position identification information indicating whether or not the packet is a packet having a start code (SC) at a top of a TS payload is recorded as header information of the TS packet storing video data.

Furthermore, a sixth aspect of the present disclosure is a program causing an information processing device to execute data format conversion, the information processing device including a data converting unit configured to execute format conversion from an MPEG-2TS format to an MP4 format, wherein the program causes the data converting unit to execute processing of sorting out TS packets storing video data from MPEG-2TS format data, processing of selecting a TS packet having a start code (SC) at a top of a payload on the basis of header information of the sorted out TS packets, and processing of extracting payload configuration data other than the start code (SC) and setting the payload configuration data as configuration data of MP4 format data.

Furthermore, a seventh aspect of the present disclosure is a program causing an information processing device to execute data generation processing, the information processing device including a data generation unit configured to generate MPEG-2TS format data, wherein the program causes the data generation unit to generate a TS packet in which start code position identification information indicating whether or not the packet is a packet having a start code (SC) at a top of a TS payload is recorded as header information of the TS packet storing video data.

Note that the program of the present disclosure is, for example, a program that can be provided to an information processing device or computer system capable of executing various program codes by a storage medium or communication medium for providing the program in a computer readable format. When the program is provided in a computer readable format, processing corresponding to the program is realized in the information processing device or computer system.

Other objects, features, and advantages of the present disclosure will be disclosed by more detailed description based on examples of the present disclosure described later and attached drawings. Note that the term "system" in this specification is a configuration of a logical set of a plurality of devices and is not limited to a configuration in which devices having respective configurations are provided in the same housing.

Effects of the Invention

According to a configuration of an example in the present disclosure, it is possible to accurately and securely execute conversion from an MPEG-2TS format to an MP4 format.

Specifically, a data converting unit that executes format conversion from an MPEG-2TS format to an MP4 format sorts out TS packets storing video data from MPEG-2TS format data, selects a TS packet having a start code (SC) at the top of a payload on the basis of header information of the sorted out TS packets, and extracts payload configuration data other than the start code (SC) and sets the payload configuration data as configuration data of MP4 format data. The data converting unit determines, on the basis of, for example, a value of a transport priority set in a header of the TS packet, whether or not the TS packet is a TS packet in which a start code (SC) is set in a top region of a payload.

With this configuration, it is possible to accurately and securely execute conversion from the MPEG-2TS format to the MP4 format.

Note that effects described in this specification are merely examples and are not limited, and an additional effect may be exerted.

BRIEF DESCRIPTION OF DRAWINGS

FIG. 4 is an explanatory view of an MP4 format.

FIG. 7 is an explanatory view of a difference between an MPEG-2TS and an MP4 format.

FIG. 14 is an explanatory view of a data adjustment example for setting a start code (SC) at the top of a payload of a TS packet.

FIG. 20 is a flowchart showing a sequence of data conversion processing executed by an information processing device.

MODE FOR CARRYING OUT THE INVENTION

Figure 1:
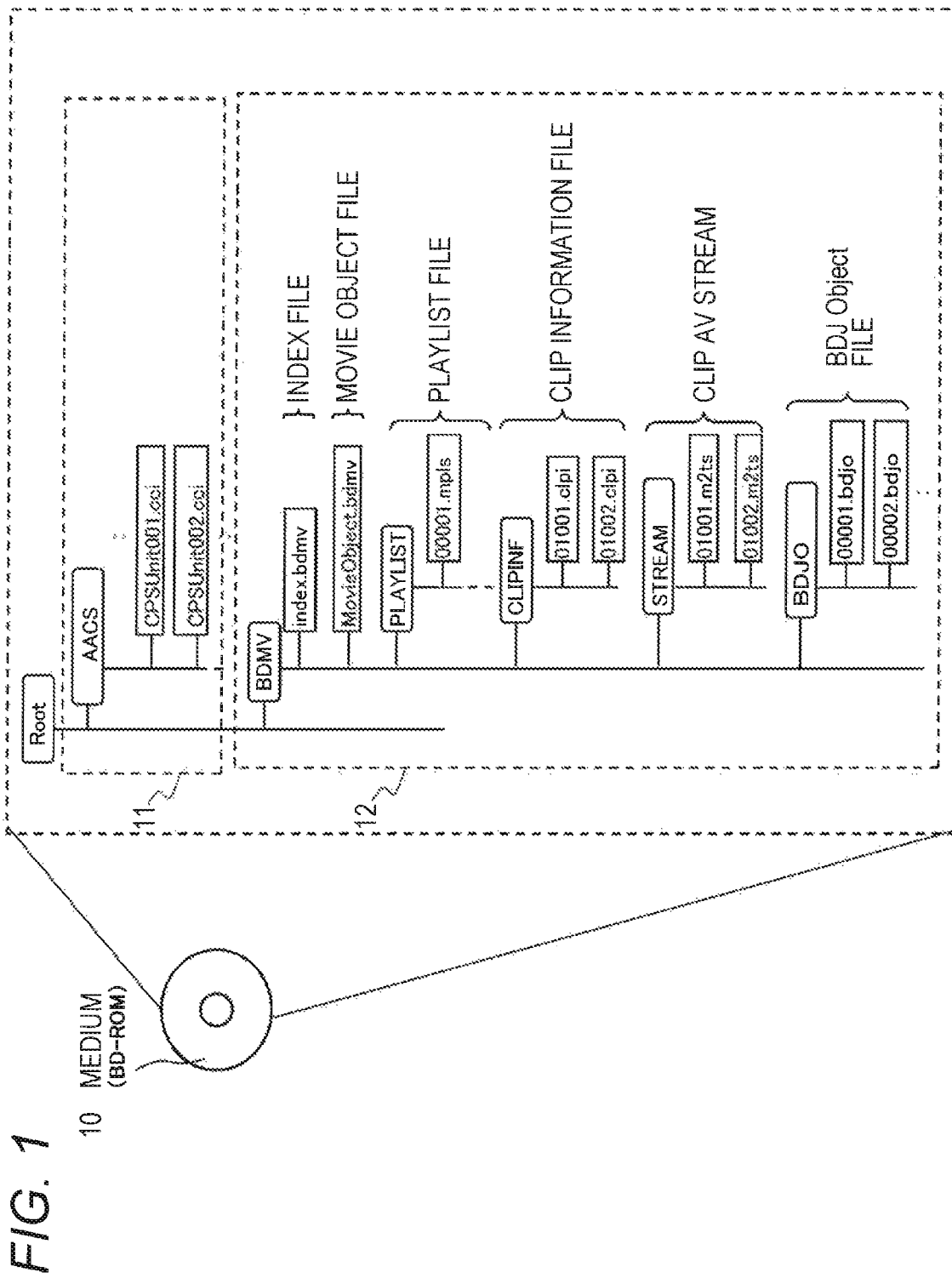
FIG. 1 is an explanatory view of a directory configuration example of data recorded on a medium in a BDMV format.

Hereinafter, details of an information processing device, an information generation device, an information recording medium, an information processing method, and a program of the present disclosure will be described with reference to the drawings. Note that description will be made in accordance with the following items.

1. MPEG2-TS format and MP4 format
2. Problem arising when MPEG-2TS is converted to MP4
3. Configuration for accurately executing format conversion from MPEG-2TS to MP4 (Example 1)
4. Calculation example of length information in MP4 format
5. Measure to cope with restriction of data length of TS packet
6. Example where start code (SC) position identification TS packet is set (Example 2)
7. Configuration example of information processing device for performing format conversion
8. Configuration example of information processing device for performing data generation or recording processing
9. Sequences of format conversion processing
10. Other examples
11. Overview of configurations of present disclosure 1. MPEG-2TS Format and MP4 Format An MPEG-2TS (transport stream) format and an MP4 format will be described.

Both the MPEG-2TS format and the MP4 format are formats prescribing a data storage format (container format) of encoded data and the like used when the encoded data serving as content configuration data, such as video, audio, and subtitles, is stored in a recording medium or is transmitted via a broadcast wave or network.

The MPEG-2TS format is a format (container format) standardized in ISO13818-2 and is used for, for example, recording of data on Blu-ray (registered trademark) discs (BDs) or digital broadcasting.

Meanwhile, the MP4 format is a format (container format) prescribed in ISO/IECC14496-14 and is a format suitable for, for example, recording of data on a flash memory or the like.

Many currently used portable terminals have a reproduction application capable of reproducing MP4 data recorded in the MP4 format, and, in the case where a content is recorded on a medium of a portable terminal, the content needs to be recorded in the MP4 format in many cases.

The Blu-ray (registered trademark) disc movie (BDMV) format described above, which is a data recording format for BDs, is a format only for BDs containing, as a component, encoded data of video, audio, and the like stored in the MPEG-2TS format.

Note that encoded data of video, audio, and still images allowed to be stored in the MPEG-2TS format is, for example, the following encoded data.

Video: MPEG-1, MPEG-2, AVC (MPEG-4AVC), HEVC (MPEG-4HEVC)
Audio: MP1, MP2, MP3, linear PCM, DTS
Still image: JPEG For example, the above encoded data is stored while being divided into transport stream (TS) packets prescribed in the MPEG-2TS.

The MPEG-2TS format for use in BDs and broadcasting will be described with reference to FIG. 1 and the following drawings.

FIG. 1 shows a directory of record data in the BDMV format recorded on a medium 10 such as a ROM-type Blu-ray (registered trademark) disc (BD).

As shown in FIG. 1, the directory is divided into two sections, i.e., a management information setting section 11 (AACS directory) and a data section 12 (BDMV directory).

In the management information setting section 11 (AACS directory), a CPS unit key file that is an encryption key of data, a usage control information file, and the like are stored.

Meanwhile, in the BDMV directory of the data section 12, for example, the following files are recorded:
an index file;
a playlist file;
a clip information file;
a clip AV stream file; and
a BDJO file.

In the index file, title information serving as index information applied to reproduction processing is stored.

The playlist file is a file prescribing reproduction order and the like of contents according to program information of a reproduction program designated by a title and has designation information of clip information containing reproduction position information.

The clip information file is a file designated by the playlist file and has reproduction position information and the like of the clip AV stream file.

The clip AV stream file is a file storing AV stream data to be reproduced.

The BDJO file is a file storing execution control information of a file storing a JAVA (registered trademark) program, a command, and the like.

A sequence in which an information processing device reproduces a content recorded on an information recording medium is as follows.

(a) A certain title is designated from the index file by a reproduction application.

(b) A reproduction program associated with the designated title is selected.

(c) A playlist prescribing reproduction order and the like of contents is selected in accordance with program information of the selected reproduction program.

(d) An AV stream or command serving as content actual data is read out on the basis of clip information prescribed in the selected playlist, and reproduction processing of the AV stream or execution processing of the command is performed.

Figure 2:
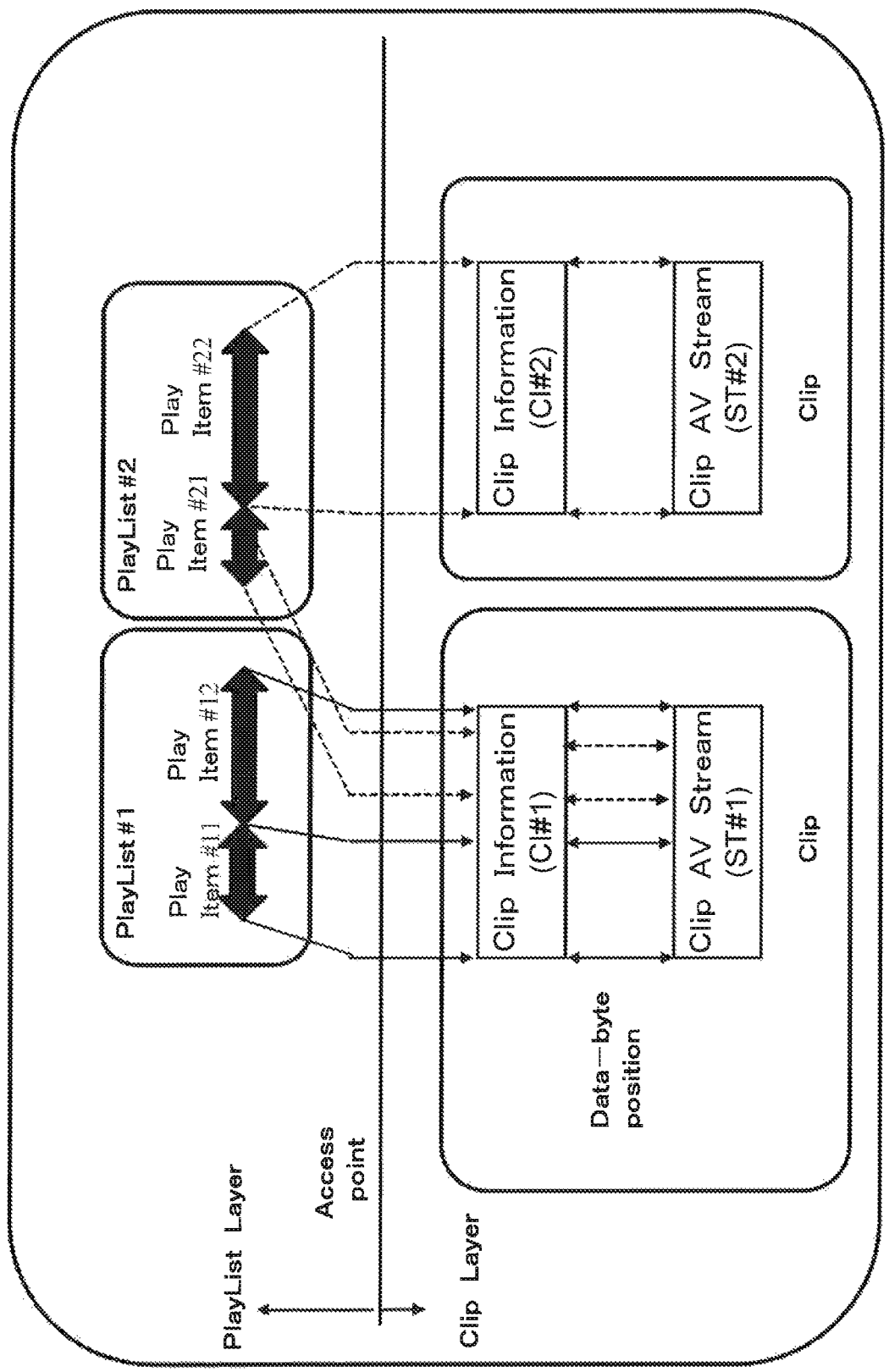
FIG. 2 is an explanatory view of a correspondence between a playlist and reproduction data prescribed in a BDMV format.

FIG. 2 shows a correspondence among pieces of the following data recorded on a first medium 110, that is,
a playlist file,
a clip information file, and
a clip AV stream file.

AV streams containing video and audio data serving as actual data to be reproduced are recorded as clip AV stream files, and playlist files and clip information files are prescribed as management information files and reproduction control information files of those AV streams.

As shown in FIG. 2, those files in a plurality of categories can be divided into the following two layers:

a playlist layer including the playlist files; and a clip layer including the clip AV stream files and the clip information files.

Note that a single clip information file is associated with a single clip AV stream file, and a pair of those files is considered to be a single object and is collectively called "clip" in some cases.

Detailed information of data contained in the clip AV stream file, for example, management information, such as an EP map in which I picture position information and the like of MPEG data are recorded, is recorded in the clip information file.

The clip AV stream file stores data in which an MPEG-2TS (transport stream) is arranged in accordance with a prescribed structure of the BDMV format. Details of this configuration will be described later with reference to FIG. 3.

Furthermore, the clip information file stores, for example, management information for acquiring a reproduction start position and the like of storage data in the clip AV stream file, such as correspondent data including, for example, a data position of byte stream data of the clip AV stream file and a reproduction time position serving as a reproduction entry point (EP) when the data is developed on the time axis.

For example, when a timestamp indicating an elapsed time position of reproduction of a content from an entry point is supplied, it is possible to acquire a data reading-out position of the clip AV stream file, i.e., an address serving as a reproduction entry point with reference to the clip information file.

The playlist file has reproduction section designation information of reproducible data included in the clip (=clip information file+clip AV stream file) layer.

One or more play items are set in the playlist file, and each of the play items has reproduction section designation information of reproducible data included in the clip (=clip information file+clip AV stream file) layer.

Figure 3:
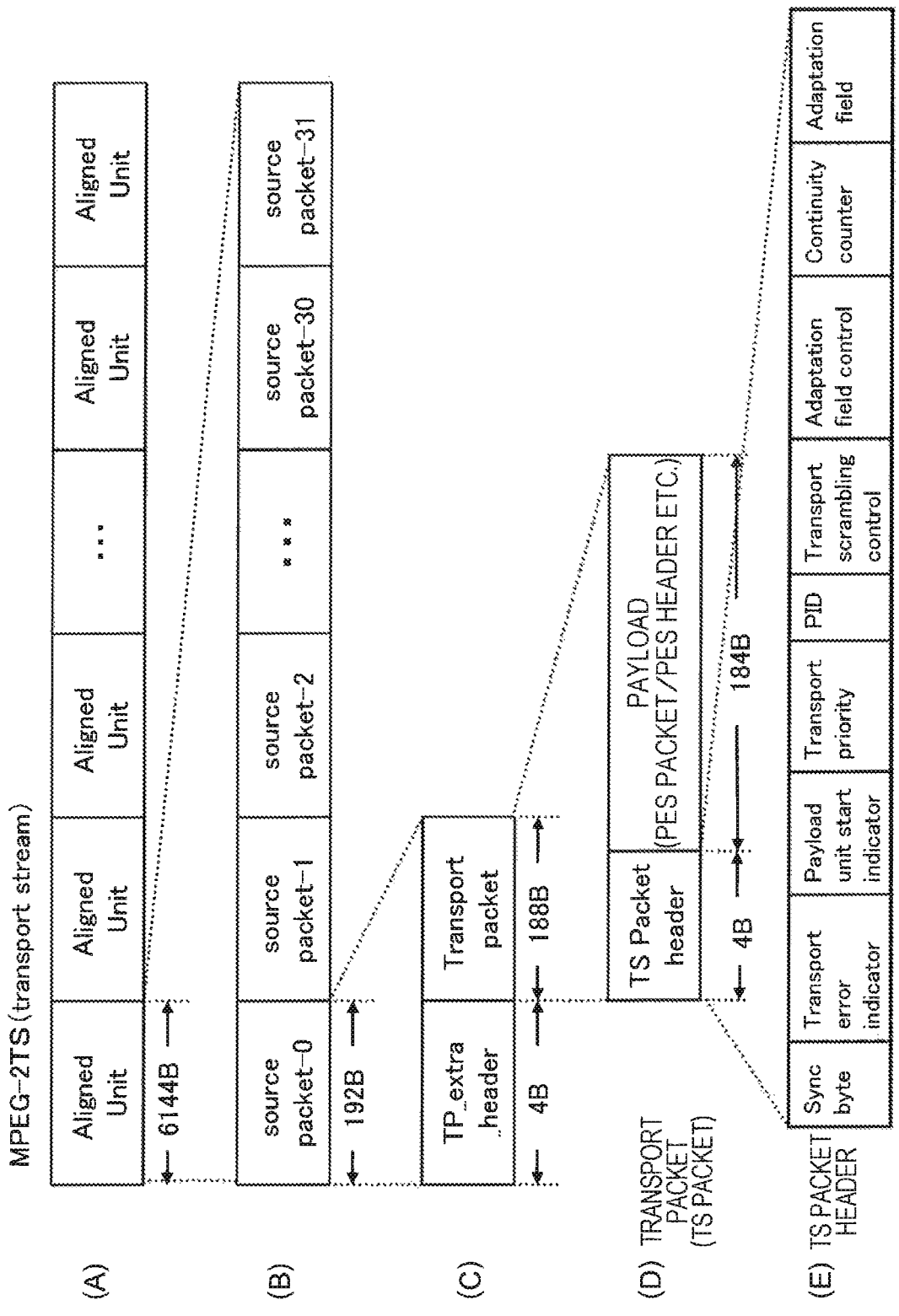
FIG. 3 is an explanatory view of a configuration example of an MPEG-2TS (transport stream) serving as a data configuration of a clip AV stream file.

The clip AV stream file storing actual data of video and audio to be reproduced has an MPEG-2 transport stream (TS) file structure shown in, for example, FIG. 3.

As shown in FIG. 3, the MPEG-2TS format has the following characteristics.

1) An MPEG-2TS file includes the integer number of aligned units.

2) A size of the aligned unit is 6 kB (=6144 bytes (2048×3 bytes)).

3) The aligned unit starts from a first byte of a source packet.

4) The source packet has a length of 192 bytes. A single source packet includes a TP_extra_header and a TS packet. The TP_extra_header has a length of 4 bytes, and the TS packet has a length of 188 bytes.

5) The TS packet includes a header (TP header) and a payload section. In a payload of a single TS packet, encoded data of a single type of data, e.g., video or audio, is stored.

6) In the header (TP header) of the TS packet, a PID (program ID) indicating the data type of the payload is recorded.

7) The payload of the TS packet includes a packet storing an elementary stream (ES) that is encoded data of video, audio, or the like (packetized elementary stream (PES)), a PES header, and the like.

8) In the PES header, a presentation timestamp (PTS) indicating reproduction time information of an elementary stream (ES) stored in a subsequent PES packet is recorded.

Furthermore, as shown in (E) of FIG. 3, the following data is stored in header information of the TS packet.

(a) synchronous byte (Sync byte)

(b) transport error indicator (Transport_error_indicator)

(c) payload unit start indicator (Payload_unit_start_indicator)

(d) transport priority (Transport_priority)

(e) program ID (PID)

(f) transport scrambling control (Transport scrambling control)

(g) adaptation field control (Adaptation field control)

(h) continuity counter (Continuity counter)

(i) adaptation field (Adaptation field)

An overview of the MP4 format will be described with reference to FIG. 4 and FIG. 5.

FIG. 4 shows the following two examples as examples of the MP4 format prescribed in ISO/IEC14496-14.

(a) fragmented MP4 file (fragmented movie)

(b) non-fragmented MP4 file (non-fragmented movie)

The MP4 files shown in (a) and (b) of FIG. 4 are files set as a single processing unit in data recording or reproducing processing in the MP4 format.

(a) The fragmented MP4 file (fragmented movie) is a file format in which data such as video and audio serving as data to be reproduced is stored while being divided for each piece of reproduction data within a predetermined time.

(b) The non-fragmented MP4 file (non-fragmented movie) is a file format in which data such as video and audio serving as data to be reproduced is stored while not being divided.

In the MP4 file, region setting is performed in the box unit, and data defined in the box unit is stored in each box.

Each box has a box-size region, a box-type region, and a box-data region.

In the box-size, a data length (byte size) of the box is recorded.

In the box-type, the type of data stored in the box is recorded.

In the box-data, data of the type indicated by the box-type is recorded.

In the fragmented MP4 file shown in (a) of FIG. 4, the following types of boxes are set:

a moov box;

a trak box;

a moof box;

a traf box; and an mdat box.

The above boxes are set.

Actual data, which is data to be reproduced such as video, audio, and subtitles, is divided to be stored in the mdat boxes.

Furthermore, the moof boxes are associated with the mdat boxes, respectively, and, in each moof box, metadata, such as attribute information and reproduction control information on the divided actual data stored in the mdat box associated with the moof box, is stored.

Assuming that the actual data (mdat), which is the divided data of the data to be reproduced, and the metadata (moof) corresponding to the divided actual data are a single set of data, the fragmented MP4 file shown in (a) of FIG. 4 stores a large number of sets of data and further stores, in the moov box, metadata regarding the whole plurality of sets of data stored therein.

The traf box is set in the metadata (moof) corresponding to the divided actual data.

In the traf box, reproduction sequence information and the like of the actual data (mdat) associated therewith are stored.

The moov box is a box set as a storage region for metadata such as reproduction control information of the data stored in the whole MP4 file.

In the moov box, one or more trak boxes are set. The trak box can be set for each type of data such as video, audio, or subtitles and stores reproduction sequence information of each data.

Note that, in the case where a plurality of different types of video data, such as HD video and 4K video, is contained in reproduction data stored in the MP4 file, it is possible to set individual trak boxes in accordance with the video types.

Furthermore, in the case where a plurality of different types of audio data, such as Japanese audio and English audio, is contained in audio data stored in the MP4 file, it is possible to set individual trak boxes in accordance with the audio types.

Similarly, in the case where a plurality of different types of subtitle data, such as Japanese subtitles and English subtitles, is contained in subtitle data stored in the MP4 file, it is possible to set individual trak boxes in accordance with the subtitle types.

(b) The non-fragmented MP4 file (non-fragmented movie) is a file format in which data such as video and audio serving as data to be reproduced is stored while not being divided.

In the non-fragmented MP4 file shown in (b) of FIG. 4, the following types of boxes are set:
a moov box;
a trak box; and
an mdat box.

The above boxes are set.

In the mdat box, actual data to be reproduced is stored.

In the moov box, metadata set corresponding to the actual data (mdat) serving as data to be reproduced, such as metadata containing attribute and reproduction control information of the actual data (mdat) to be reproduced, is stored.

In the trak box set in the moov box, reproduction sequence information and the like of the actual data (mdat) are stored.

One or more trak boxes are set in the moov box set in the (b) non-fragmented MP4 file, as well as in the (a) fragmented MP4 file. Each trak box is set for each type of data such as video, audio, or subtitles.

FIG. 4 shows basic configuration examples of the MP4 format.

Digital entertainment content ecosystem (DECE), which is a standards body related to the MP4 format, standardized a common file format (CFF) as a new MP4-based file format. This CFF will be described with reference to FIG. 5.

Figure 5:
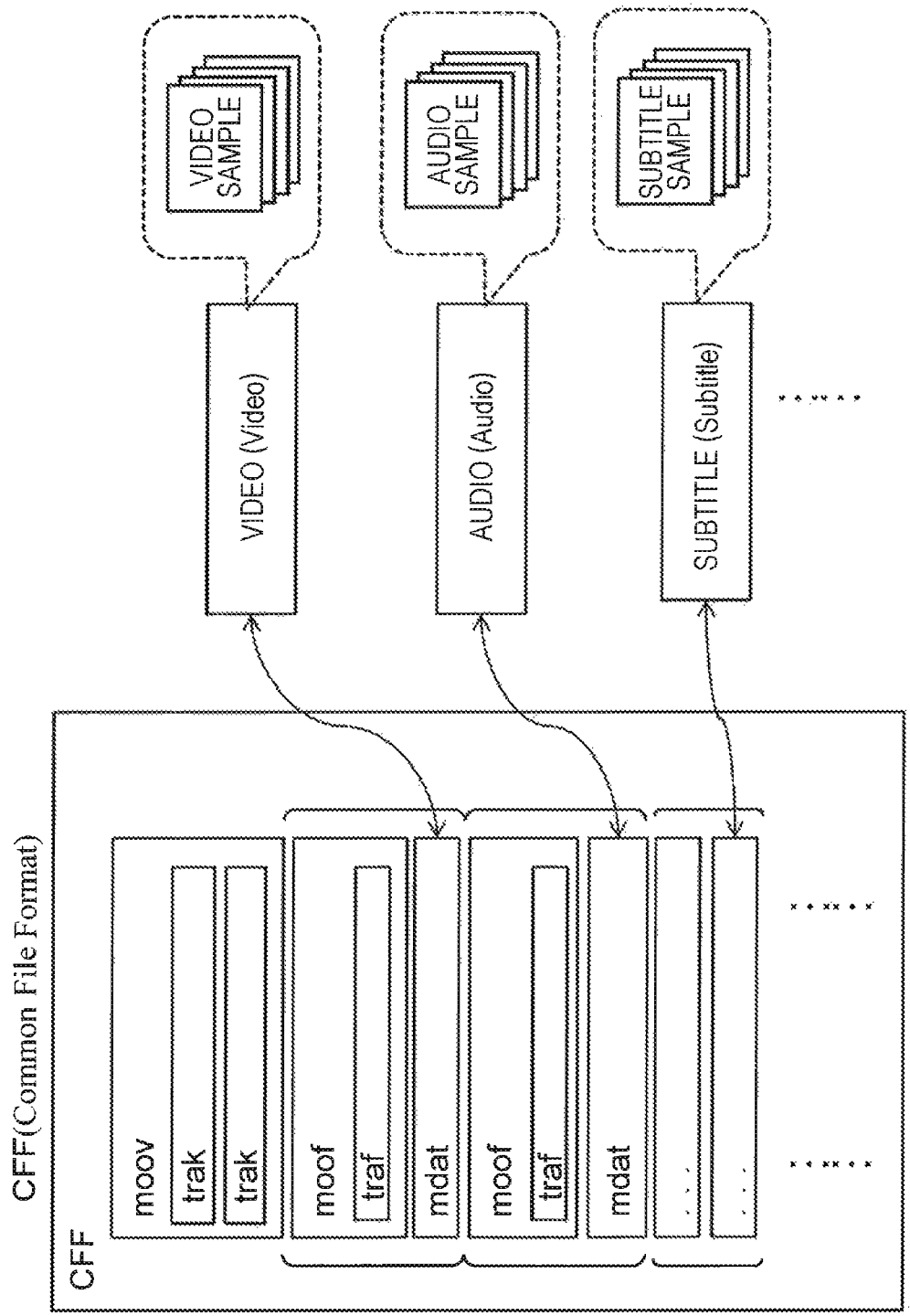
FIG. 5 is an explanatory view of a configuration of a common file format (CFF).

The common file format (CFF) shown in FIG. 5 basically has a data configuration similar to that of the fragmented (fragmented movie) MP4 described above with reference to (a) of FIG. 4.

That is, in the common file format (CFF) file shown in FIG. 5, as well as in the fragmented MP4 file in (a) of FIG. 4 described above, the following boxes are set:
a moov box;
a trak box;
a moof box;
a traf box; and
an mdat box.

The above boxes are set.

Storage data in each box is substantially similar to the storage data in each box of the fragmented MP4 file in (a) of FIG. 4.

However, in the CFF, there is a restriction that only a single type of data is stored in each mdat box.

That is, any one of the following types of data is stored in each mdat box.
(a) video
(b) audio
(c) subtitles There is a restriction that the above types of data (a) to (c) must not be mixedly stored.

Note that, in the case where a plurality of different types of video data, such as HD video and 4K video, is contained in the CFF file, those different types of video are stored in different mdat boxes.

Similarly, different types of audio data such as Japanese audio and English audio are stored in individual mdat boxes, and Japanese subtitles and English subtitles are stored in different mdat boxes.

In the general fragmented MP4 file shown in (a) of FIG. 4, different types of data such as video, audio, and subtitles are allowed to be mixedly stored in an mdat box set as a storage box for a single piece of divided data (fragment).

However, in the common file format (CFF) shown in FIG. 5, there is a restriction that only a single type of data can be stored in a single mdat box.

That is, only a single type of data, i.e., video, audio, or subtitles is stored in each mdat box.

Therefore, a moof box serving as a metadata storage region corresponding to the mdat box is also set to store metadata set corresponding to the single type of data, i.e., video, audio, or subtitles.

Note that storage data in the mdat box, which is a data section of the MP4 format, is divided into samples serving as a basic data unit.

In the common file format (CFF), a set of data samples of the same type, i.e., a set of only video samples, a set of only audio samples, or a set of only subtitle samples is stored in a single mdat box.

Furthermore, in the CFF prescribed by the DECE, encoding modes (codecs) and data formats of video, audio, and subtitles which are allowed to be stored in a CFF file are also prescribed.

The data formats allowed to be stored in a CFF file are, for example, the following data formats.
Video: AVC (MPEG-4AVC), HEVC (MPEG-4HEVC)
Audio: MPEG-4-AAC, Dolby, AC-3
Subtitle: SMPTE Timed Text (SMPTE-TT)

2. Problems Arising when MPEG-2TS is Converted to MP4

There will be described problems arising at the time of, for example, processing for converting MPEG-2TS format data recorded on a Blu-ray (registered trademark) disc (BD) or MPEG-2TS format data input via a network or broadcast wave to the MP4 format and recording the converted data on a medium such as a flash memory.

Note that, hereinafter, a conversion processing example of AVC or HEVC encoded video data allowed to be stored in both the MPEG-2TS format and the MP4 format will be described.

Specifically, there will be described a processing example where AVC or HEVC encoded video data stored in the MPEG-2TS format in a medium such as a BD is converted to an encoded data storage format according to MP4 format data and is recorded on a medium such as a flash memory.

A basic configuration of the AVC or HEVC encoded video data will be described with reference to FIG. 6.

For example, encoded data corresponding to data of a single image (single picture) and a parameter to be applied to decoding processing thereof are stored in a plurality of network abstraction layer units (NAL units).

A set of NAL units corresponding to data of a single image is called an access unit (AU).

Figure 6:
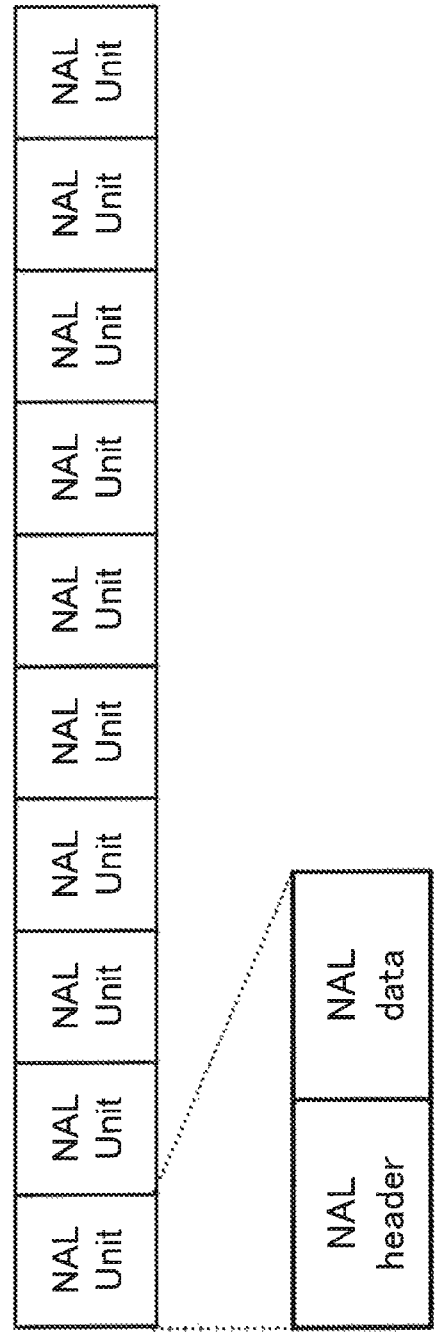
FIG. 6 is an explanatory view of a configuration of AVC, HEVC encoded data.

That is, as shown in (A) of FIG. 6, AVC encoded video data and HEVC encoded video data include a plurality of NAL units.

Each NAL unit has a NAL header and NAL data, and, in the NAL header, attribute information (metadata) corresponding to the NAL data, such as data type identification information of the NAL unit, is stored.

In each NAL unit, not only encoded data of video but also, for example, sequence information of the encoded data and a parameter to be applied to decoding processing are stored.

The type of data stored in each NAL unit is identified on the basis of an ID of the NAL header.

The data stored in the NAL unit is, for example, the following data.

(1) AU delimiter (AUD): a start position of an access unit (AU)
(2) SPS: sequence parameters
(3) PPS: picture parameters
(4) SEI: various kinds of supplementary information
(5) Slice data: a component of encoded video data
(6) Filler data: size adjustment data
(7) End of **: an end position of the access unit (AU)

The above data is stored in each NAL unit.

In the case where AVC encoded video data or HEVC encoded video data is stored in both the MPEG-2TS format and the MP4 format prescribing a storage format (container format) of encoded data, the NAL units shown in FIG. 6 are stored in each format.

FIG. 7 shows storage examples of NAL units in those two formats.

(1) of FIG. 7 shows a storage example of NAL units in the MPEG-2TS format and is called a byte stream format.

(2) of FIG. 7 shows a storage example of NAL units in the MP4 format and is called a sample structure.

In the MPEG-2TS format shown in (1) of FIG. 7, a start code (SC) is set before each NAL unit.

The start code (SC) is an identifier indicating a start position of a NAL unit and has a certain bit stream (0x000001).

For example, a reproduction device for performing processing of MPEG-2TS format data can detect a code (0x000001) of the start code (SC) and identify a position subsequent to the SC as a NAL unit start position. With this identification processing, it is possible to accurately extract NAL unit configuration data.

Meanwhile, in the MP4 format shown in (2) of FIG. 7, length information (Length) is set before each NAL unit.

The length information (Length) is data indicating a data length (size) of the next NAL unit, and a data length (size) of each NAL unit is stored therein.

For example, a reproduction device for performing processing of MP4 format data can determine a data length of a NAL unit in the next position on the basis of length information (Length) and can extract NAL unit configuration data in accordance with the data length (size).

Note that NAL units can be set to have various data lengths, and therefore lengths of the NAL units are different from one another.

As shown in (1) and (2) of FIG. 7, the MPEG-2TS and MP4 formats storing AVC/HEVC video encoded data are different formats.

Specifically, the start code (SC) in the MPEG-2TS is replaced with the length information (Length) in the MP4 format.

NAL units are stored in both the MPEG-2TS and the MP4 format.

Therefore, in the case where MPEG-2TS format data is converted to MP4 format data, it is necessary to perform processing of accurately determining a position of a start code (SC) in the MPEG-2TS, securely acquiring a NAL unit from the MPEG-2TS format data, and setting the NAL unit as configuration data of the MP4 format data.

However, the existing BDMV standard of BD-ROMs prescribes that encryption is performed in the unit of aligned unit (6144 bytes) described above with reference to FIG. 3. According to this prescription, a start code (SC) is also encrypted and then recorded.

In order to perform conversion processing from MPEG-2TS to MP4, it is necessary to identify a position of a start code (SC). Therefore, it is necessary to decode encrypted data in the unit of aligned unit once and check the start code (SC) (=0x000001)).

Thus, decoding data at the time of format conversion from MPEG-2TS to MP4, checking a start code (SC) (=0x000001)), re-encrypting the data, converting the data to the MP4 format, and recording the converted data on a flash memory increase a processing load in a user's device. Furthermore, decoding processing at the time of conversion increases a possibility of leakage of a plain text content, which is not preferable also in terms of copyright protection of contents.

In order to solve such a problem, in ISO23001-9 (under development), a new standard for BD-ROMs is being prepared. Specifically, a standard to change an encryption method of an MPEG-2TS and allow subsample encryption that encrypts only a part of configuration data of the MPEG-2TS is under consideration for approval.

In this new standard, the following is allowed: a start code (SC) in an MPEG-2TS is excluded from an encryption target and the start code (SC) in the MPEG-2TS is recorded on the MPEG-2TS as a plain text.

This allows confidential video data to be an encryption target and accompanying data such as a start code (SC) to be non-encrypted data (plain text).

Figure 8:
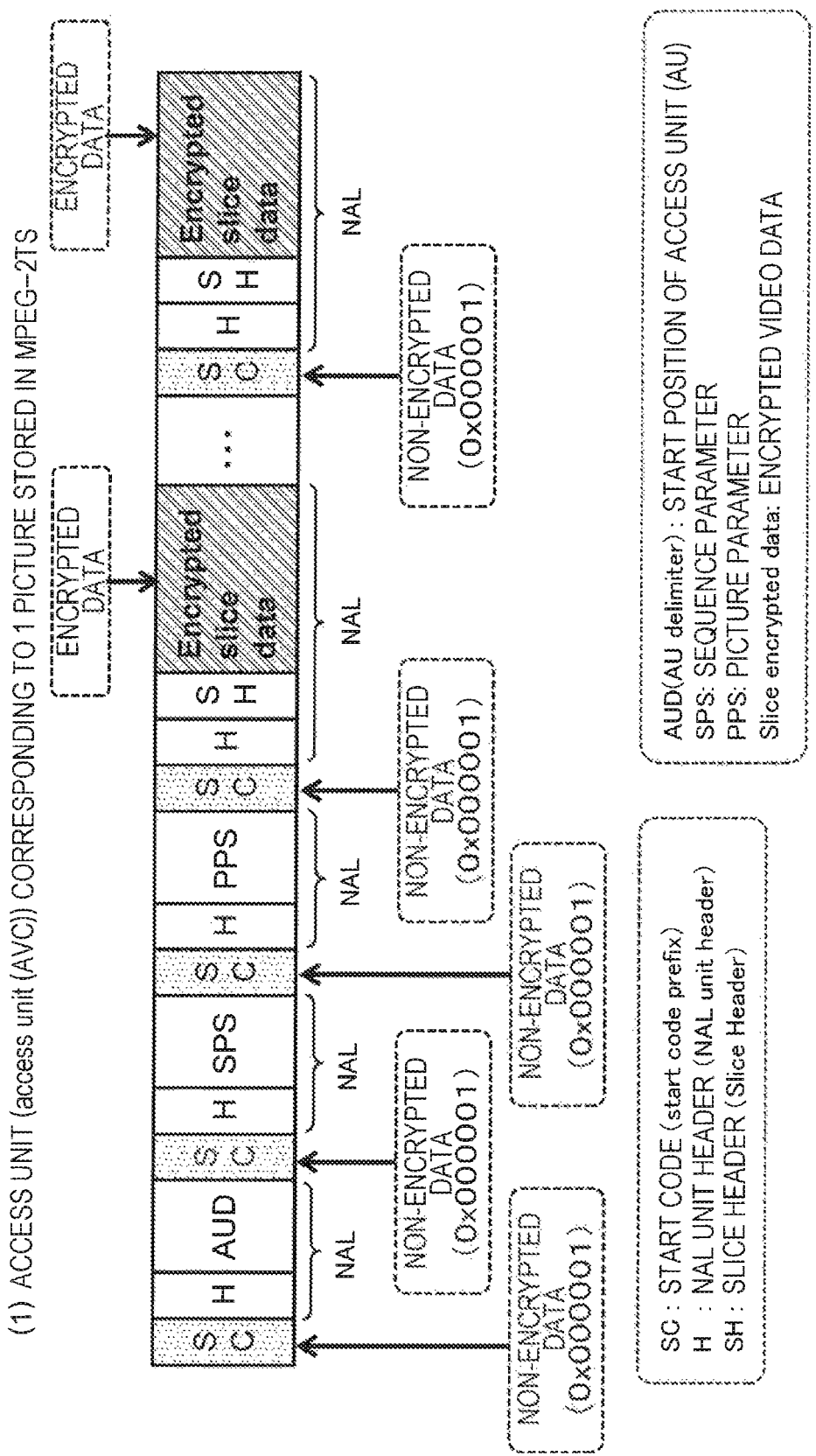
FIG. 8 is an explanatory view of a configuration of an access unit corresponding to a single picture stored in an MPEG-2TS.

A configuration example of an MPEG-2TS subjected to this subsample encryption is shown in FIG. 8.

FIG. 8 shows an example of MPEG-2TS format data of a single access unit (AU) containing encoded video data and metadata of a single picture, in which only regions of the encoded video data have been encrypted, i.e., an example of MPEG-2TS subjected to the subsample encryption.

A start code (SC) is non-encrypted data, and therefore a certain code (0x000001) is maintained as it is. Thus, a device for performing conversion from MPEG-2TS to MP4 can detect the start code (SC=0x000001) from the MPEG-2TS, extract a NAL unit subsequent to the SC, and set the NAL unit as configuration data of MP4.

The encoded video data in the NAL unit is encrypted data, and therefore it is possible to perform safe format conversion and recording processing with a low possibility of data leakage.

However, herein, a new problem arises.

This problem will be described with reference to FIG. 9.

Figure 9:
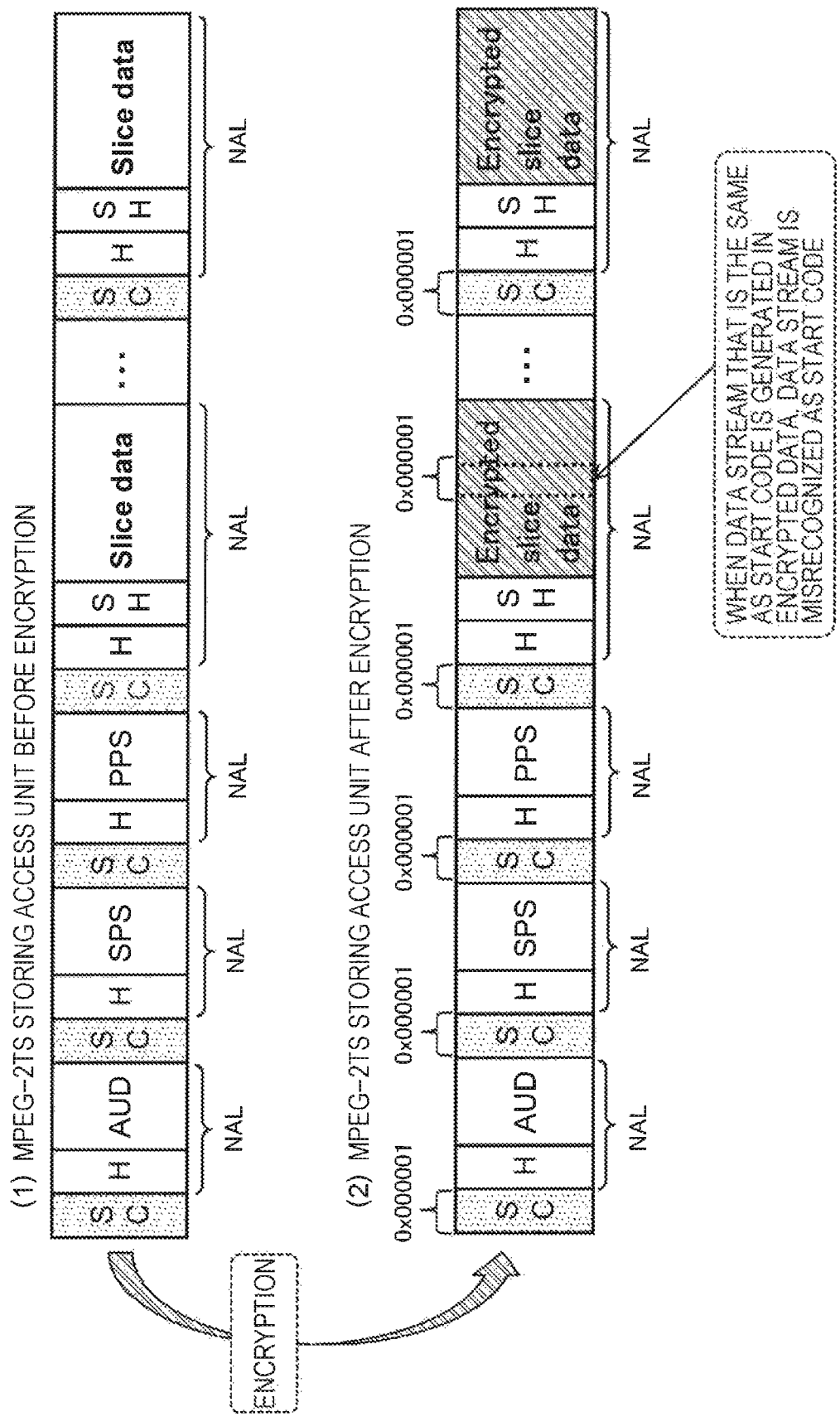
FIG. 9 is an explanatory view of a problem arising due to encryption of data contained in an access unit corresponding to a single picture stored in an MPEG-2TS.

FIG. 9 shows the following two access units (AUs).

(1) MPEG-2TS corresponding to access unit (AU) before subsample encryption (2) MPEG-2TS corresponding to access unit (AU) after subsample encryption The MPEG-2TS in (2) of FIG. 9 is a result of performing the subsample encryption described above with reference to FIG. 8 on the MPEG-2TS before encryption shown in (1) of FIG. 8. That is, the MPEG-2TS is an example of an MPEG-2TS in which only regions of encoded video data have been encrypted, i.e., an example of an MPEG-2TS subjected to the subsample encryption.

In the MPEG-2TS after encryption shown in (2) of FIG. 9, a start code (SC) is non-encrypted data and have a code (0x000001) indicating that the data is SC data.

However, a bit stream (0x000001) that is the same as the start code (SC) may be generated also in encrypted slice data serving as configuration data of the encrypted video data.

The bit stream (0x000001) in the encrypted slice data is a bit stream accidentally generated by some encryption processing of video configuration data.

A device for executing conversion processing from the MPEG-2TS format to the MP4 format may misrecognize the bit stream (0x000001) in the encrypted slice data as a start code (SC).

When such misrecognition occurs, format conversion to MP4 is not accurately executed and wrong MP4 format data is generated.

3. Configuration for Accurately Executing Format Conversion from MPEG-2TS to MP4 (Example 1)

As described above, even in the case where the subsample encryption in which a start code (SC) is not encrypted is executed, a bit stream that is the same as a start code (SC) may be generated in a data region other than the start code (SC), e.g., in encrypted data of video.

As described above, when a bit stream that is the same as a start code (SC) is accidentally generated by encryption processing and this bit stream is determined as a start code (SC), it is impossible to perform accurate format conversion from MPEG-2TS to MP4.

There will be described below an example that can solve this problem to accurately execute format conversion from MPEG-2TS to MP4.

Figure 10:
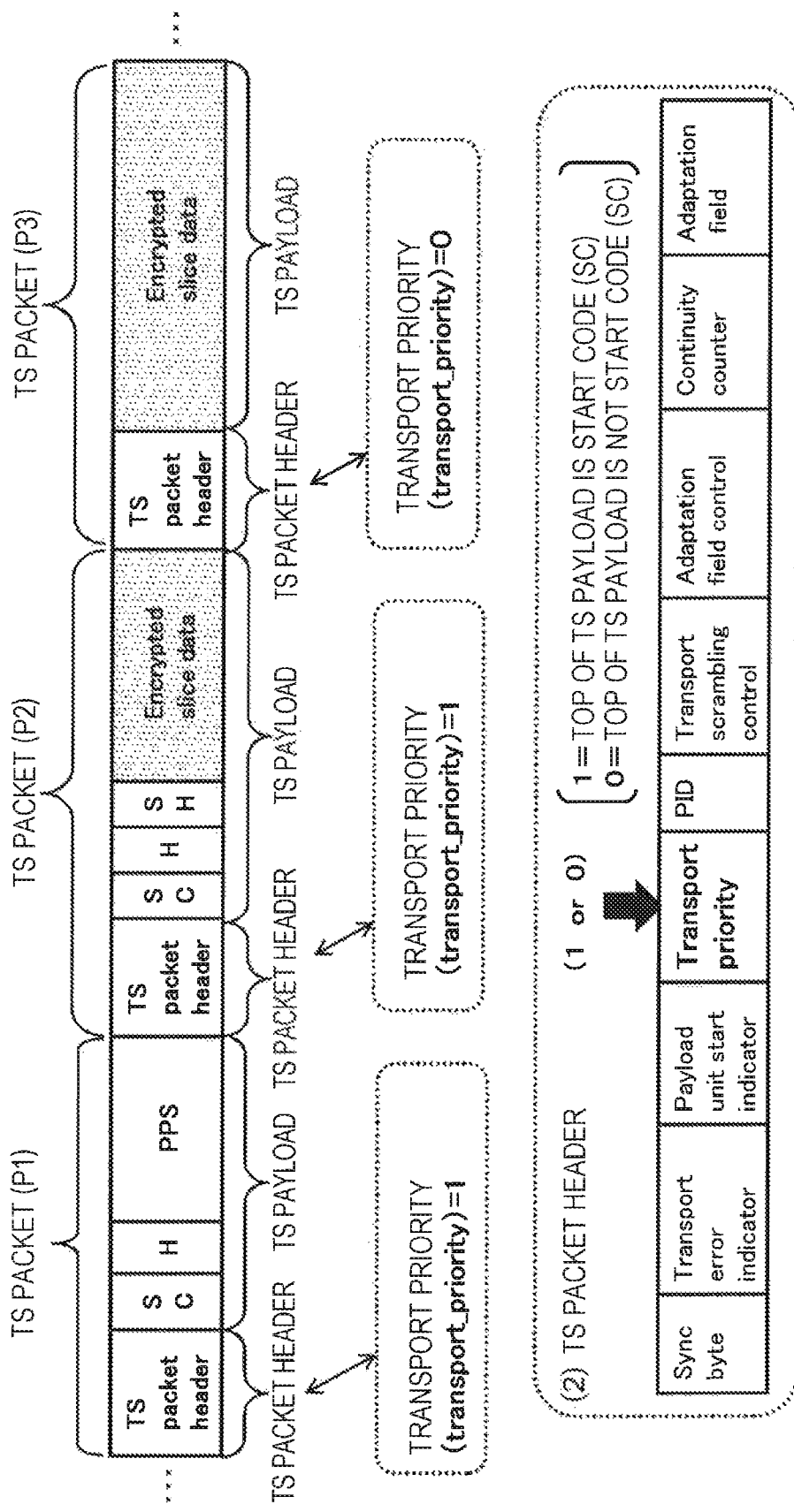
FIG. 10 is an explanatory view of a configuration example where a transport priority serving as a start code (SC) position identifier is set in a TS packet header.

FIG. 10 shows a configuration example of MPEG-2TS according to this example.

(1) of FIG. 10 shows three TS packets (P1 to P3) as a plurality of TS packets forming MPEG-2TS.

Each of the TS packets (P1 to P3) includes a TS packet header and a TS payload.

In this example, an identifier for identifying whether or not a start code (SC) is set at the top of the TS payload of the TS packet is set in the TS packet header.

A value of a transport priority set in the TS packet header is changed depending on whether or not a start code (SC) is set at the top of the TS payload.

Specifically, for example, the following setting is performed.

(a) In the case where a start code (SC) exists at the top of the TS payload, the transport priority is 1.

(b) In the case where a start code (SC) does not exist at the top of the TS payload, the transport priority is 0.

Note that, in the configuration of this example, all start codes (SCs) in the MPEG-2TS format are allowed to be set only at the top of the TS payloads. The start codes are not set at positions other than the top of the TS payloads, e.g., at middle positions or latter positions of the payloads. Data adjustment processing for this will be described later.

The TS packet header has a data configuration shown in (2) of FIG. 10 as described above with reference to FIG. 3.

The transport priority included in the TS packet header is a region that can be variously used.

In this example, the transport priority is a region for recording a start code (SC) position identifier indicating whether or not the top of the TS payload of each TS packet is a start code (SC).

Values of the transport priorities in the respective TS packet headers of the three TS packets shown in (1) of FIG. 10 are set as follows.

(1) TS packet (P1)=1 (SC exists at the top of the TS payload.)

(2) TS packet (P2)=1 (SC exists at the top of the TS payload.)

(3) TS packet (P3)=0 (SC does not exist at the top of the TS payload.)

A conversion device for executing format conversion processing from MPEG-2TS to MP4 checks a setting value of a transport priority in a TS packet header of each TS packet forming the MPEG-2TS.

In the case where it is verified that the value of the transport priority is [1] as a result of this setting-value checking processing, the conversion device determines that a start code (SC) exists at the top of the TS payload of the TS packet.

That is, the conversion device determines that a start code (SC) exists at the top of the payload and configuration data of a NAL unit exists at the subsequent position and acquires the NAL unit at the position subsequent to the start code (SC), thereby setting the NAL unit as configuration data of MP4.

On the contrary, in the case where it is verified that the setting value of the transport priority in the TS packet header of the TS packet is [0], the conversion device determines that a start code (SC) does not exist at the cop of the TS payload of the TS packet.

That is, the conversion device determines that the top of the payload of the TS packet is not a start code (SC) and the payload is configuration data of a NAL unit from the top.

The conversion device determines that NAL unit configuration data in a payload having no start code at the top is configuration data of a NAL unit that is the same as a NAL unit in a payload of a preceding TS packet.

The conversion device acquires the NAL unit in this payload and sets the NAL unit as configuration data of MP4.

This example corresponds to a processing example of the TS packet (P3) shown in (1) of FIG. 10.

A specific processing example in the conversion device for performing conversion processing from the MPEG-2TS format to the MP4 format will be described with reference to FIG. 11.

The conversion device performs conversion processing to MP4 with reference to a value of a transport priority set in a TS packet header of each TS packet forming MPEG-2TS format data.

Figure 11:
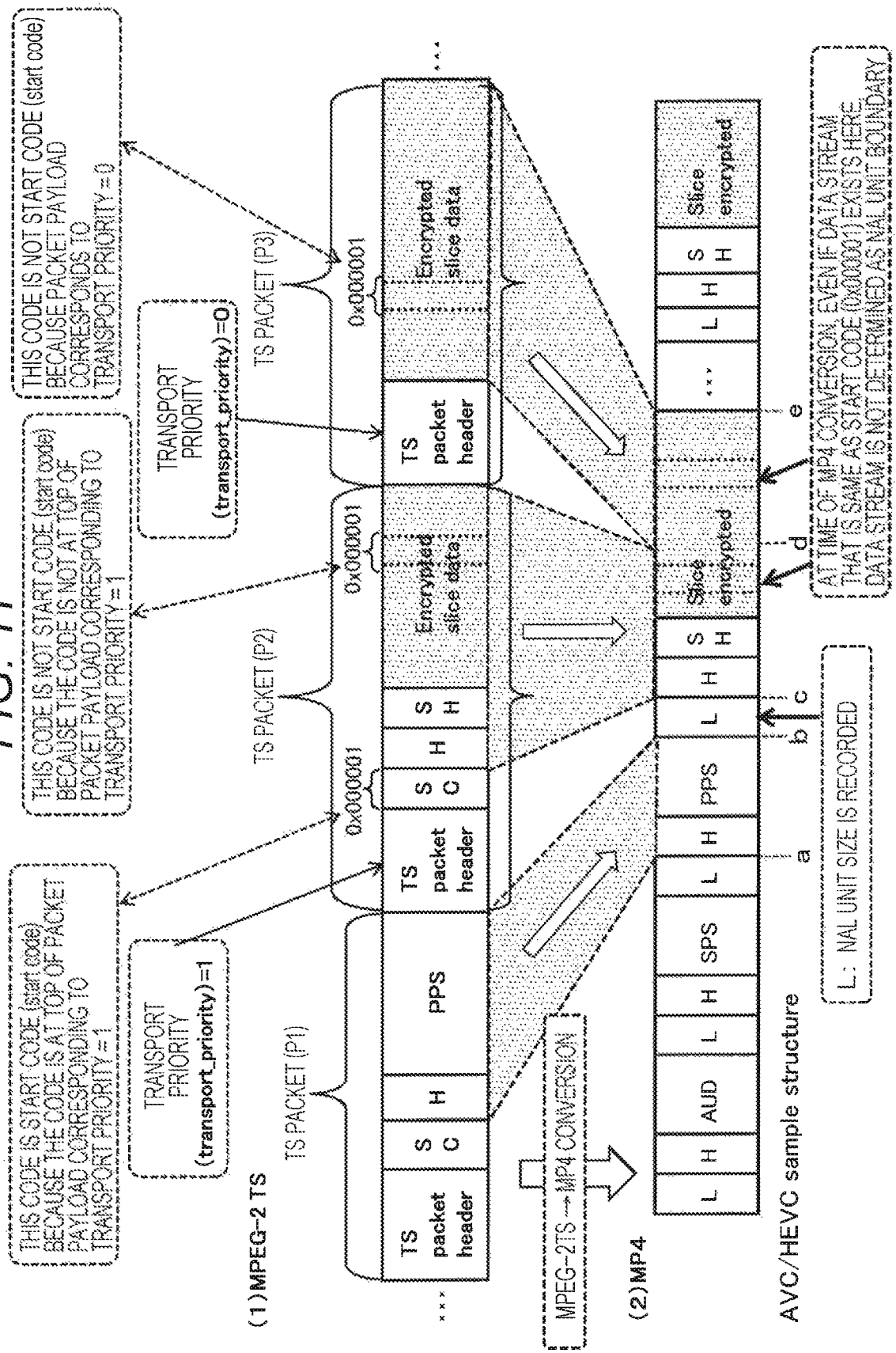
FIG. 11 is an explanatory view of a processing example of conversion to an MP4 format using a transport priority serving as a start code (SC) position identifier.

FIG. 11 shows the following two data configurations.

(1) MPEG-2TS format data before conversion (2) MP4 format data after conversion

The conversion device inputs the MPEG-2TS format data shown in (1) of FIG. 11 and executes format conversion to generate the MP4 format data shown in (2) of FIG. 11.

FIG. 11 shows details of (1) conversion processing of a TS packet (P2) and a TS packet (P3) serving as configuration data of the MPEG-2TS format data.

At the time of the processing of the TS packet (P2), the conversion device refers to a value of a transport priority set in a TS packet header of the TS packet (P2).

The value of the transport priority of the TS packet (P2) is [1].

On the basis of this value, the conversion device determines that top data of a TS payload of the TS packet (P2) is a start code (SC).

The conversion device determines, on the basis of this determination, that a TS payload subsequent to the start code (SC) at the top of the payload of the TS packet (P2) is NAL unit configuration data, extracts the NAL unit configuration data, and sets the extracted data as configuration data of the MP4 format data.

This data is configuration data of data sections c to d in the MP4 format data in (2) of FIG. 11.

Furthermore, at the time of the processing of the next TS packet (P3), the conversion device refers to a value of a transport priority set in a TS packet header of the TS packet (P3).

The value of the transport priority of the TS packet (P3) is [0].

On the basis of this value, the conversion device determines that top data of a TS payload of the TS packet (P3) is not a start code (SC).

On the basis of this determination, the conversion device determines that the payload of the TS packet (P3) is subsequent data of the NAL unit included in the payload of the preceding TS packet (P2).

The conversion device extracts the payload of the TS packet (P3) on the basis of this determination and sets the extracted data as NAL unit configuration data of the MP4 format data in (2) of FIG. 11.

The payload of the TS packet (P3) is stored at positions: d to e subsequent to the data sections c to d in the MP4 format data shown in (2) of FIG. 11, the data sections c to d storing the NAL unit configuration data extracted from the TS packet (P2) that has been antecedently processed.

Note that, although not shown in FIG. 11, in the case where a value of a transport priority of a TS packet (P4) subsequent to the TS packet (P3) of the MPEG-2TS in (1) of FIG. 11 is 1, the data position e of the MP4 shown in (2) of FIG. 11 is an end position of a single NAL unit.

On the contrary, in the case where the value of the transport priority of the TS packet (P4) is 0, a payload of the TS packet (P4) is further stored after the data position e of the MP4 shown in (2) of FIG. 11.

Note that, at the time of this conversion processing, the conversion device needs to record a length (L) prescribed in the MP4 format. That is, the conversion device needs to record a size of each NAL unit to be stored in the MP4 format data as length information (L) of the MP4 format data shown in (2) of FIG. 11.

A specific example of this length setting processing will be described later.

In the format conversion processing shown in FIG. 11, for example, the TS payloads of the TS packet (P2) and the TS packet (P3) shown in (1) of FIG. 11 contain encrypted slice data that is encrypted video data. The encrypted slice data may contain a bit stream (0x000001) that is the same as a start code (SC).

However, in this example, the conversion device does not execute start code (SC) determination processing depending on only detection of a bit stream (0x000001) indicating a code of a start code (SC).

The conversion device determines a position of a start code (SC) on the basis of a value of a transport priority in a TS packet header of each TS packet.

Therefore, even in the case where a bit stream (0x000001) that is the same as a start code (SC) is included in encrypted slice data that is encrypted video data stored as a TS payload of a TS packet as shown in (1) of FIG. 11, the bit stream is not misrecognized as a start code (SC).

With this processing, it is possible to securely perform extraction processing of a NAL unit and format conversion processing, and therefore accurate MP4 format data can be generated.

Figure 12:
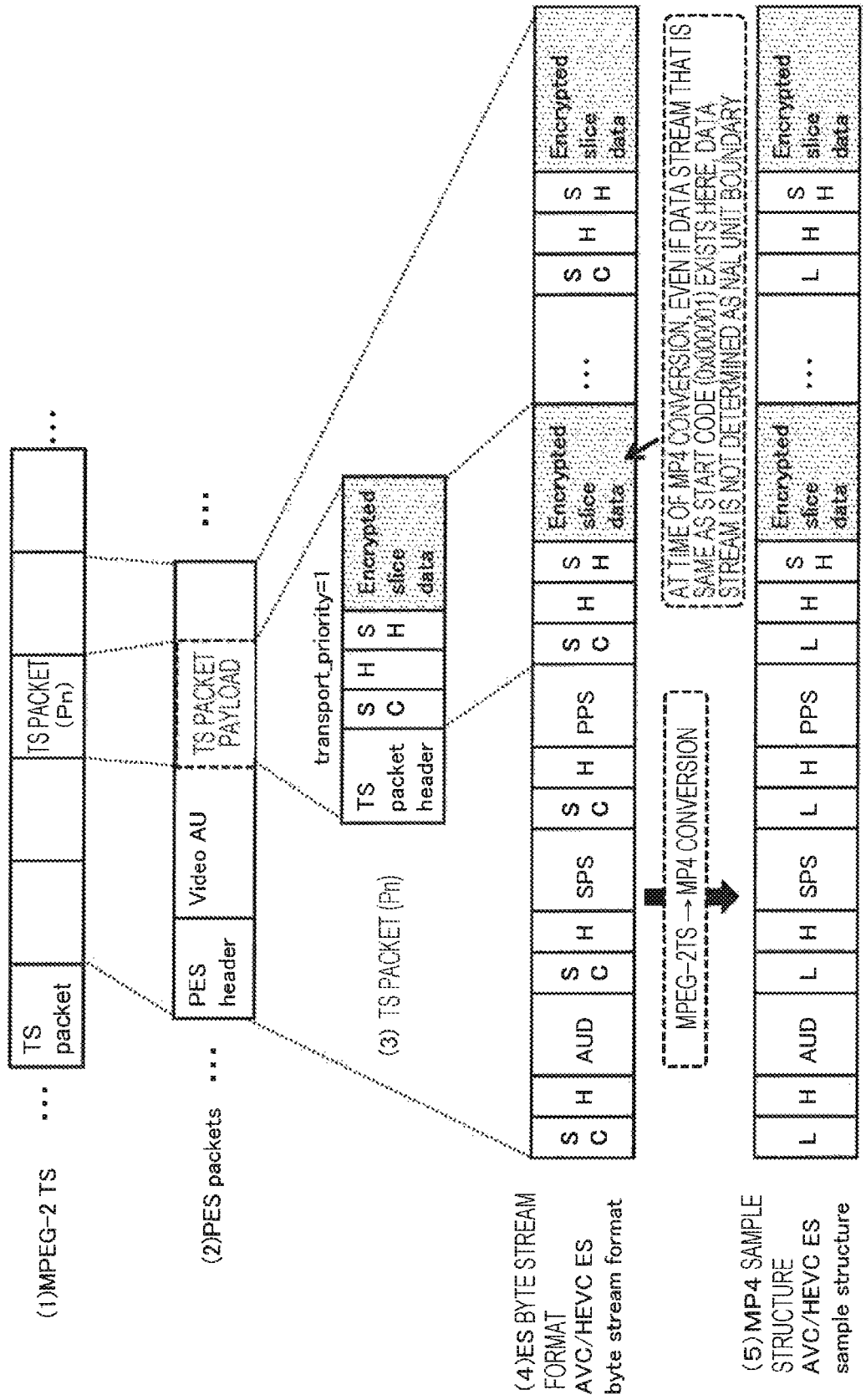
FIG. 12 is an explanatory view of a processing example of conversion to an MP4 format using a transport priority serving as a start code (SC) position identifier.

FIG. 12 is an explanatory view of a correspondence between MPEG-2TS format data and MP4 format data regarding configuration data of PES packets prescribed in the MPEG-2TS format, i.e., PES packets storing encoded data of a single picture corresponding to a single image frame and metadata thereof.

The PES packets shown in (2) of FIG. 12 are packets storing, as a payload, image data corresponding to a single image frame (single picture) and metadata containing, for example, information to be applied to decoding processing thereof.

The PES packet includes a plurality of TS packets as shown in (1) of FIG. 12.

A detailed configuration example of a single TS packet (Pn) is shown in (3) of FIG. 12.

The TS packet (Pn) shown in (3) of FIG. 12 indicates that a value of a transport priority of a TS packet header is [1], i.e., a start code (SC) exists at the top of a payload of the TS packet (Pn).

(4) of FIG. 12 shows a data stream in which only TS payloads are extracted from the TS packets forming the MPEG-2TS format data and are arranged.

This corresponds to ES (elementary stream) byte stream format (AVC/HEVC ES byte stream format) data of AVC or HEVC encoded data.

In the case where conversion from the MPEG-2TS format to the MP4 format is performed, the byte stream data shown in (4) of FIG. 12 is converted to an MP4 sample structure (AVC/HEVC sample structure) corresponding to MP4 shown in (5) of FIG. 12.

At the time of this conversion processing, it is necessary to accurately detect a position of a start code (SC) in the ES byte stream format in (4) of FIG. 12.

In the processing of the present disclosure, the position of the start code (SC) is determined on the basis of a value of a transport priority in a TS packet header of each TS packet of the MPEG-2TS.

Therefore, for example, even in the case where a bit stream (0x000001) that is similar to a start code (SC) is included in encrypted data (encrypted slice data) contained in the ES byte stream format shown in (4) of FIG. 12, it is possible to generate accurate MP4 format data shown in (5) of FIG. 12 without misrecognizing the bit stream as a start code (SC).

4. Calculation Example of Length Information in MP4 Format

As described above, in the case where MPEG-2TS format data is converted to MP4 format data, it is necessary to replace a start code (SC) of MPEG-2TS format data with length information (L) of MP4 format data.

The length information (L) of the MP4 format data is information indicating a length, i.e., a size of a subsequent NAL unit.

Therefore, the conversion device needs to calculate or acquire a size of each NAL unit to be set in the MP4 format data.

An example of calculation processing of length information (L) of a NAL unit executed by the conversion device will be described with reference to FIG. 13.

Figure 13:
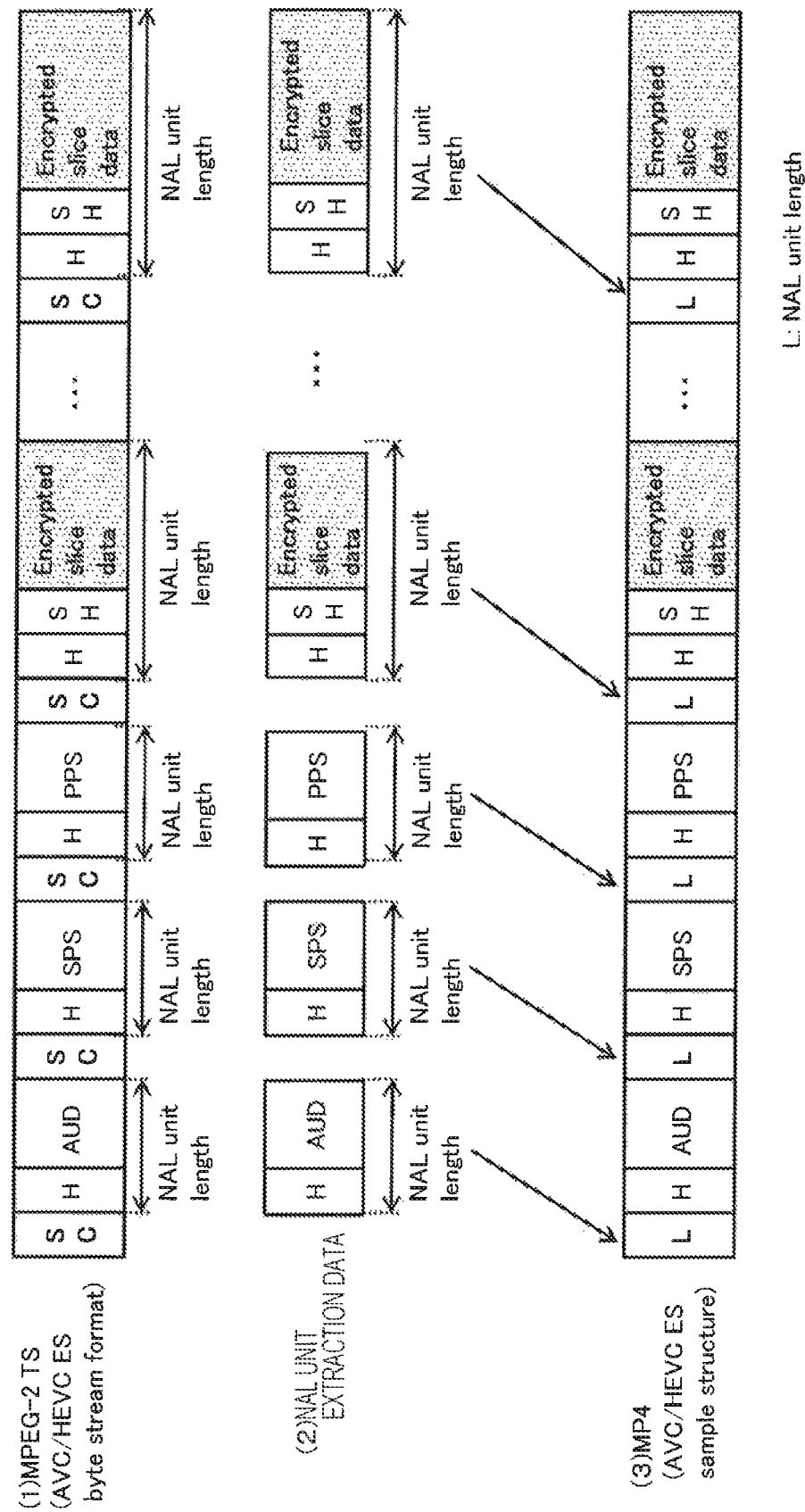
FIG. 13 is an explanatory view of a calculation processing example of a length set in MP4 format data.

(1) of FIG. 13 shows data similar to the data shown in (4) of FIG. 12. That is, the data is data in which only TS payloads are extracted from TS packets forming MPEG-2TS format data and are arranged.

This corresponds to ES (elementary stream) byte stream format (AVC/HEVC ES byte stream format) data of AVC or HEVC encoded data.

En the case where conversion from the MPEG-2TS format to the MP4 format is performed, the byte stream data shown in (1) of FIG. 13 is converted to an MP4 sample structure (AVC/HEVC sample structure) corresponding to MP4 shown in (3) of FIG. 13.

The conversion device determines positions of start codes (SCs) from the byte stream data shown in (1) of FIG. 13 on the basis of values of transport priorities in headers of TS packets.

Then, the conversion device extracts data between the start codes as a NAL unit. The conversion device calculates a data length of the data between the SCs as a data length (size) of the NAL unit.

The conversion device sets the calculated value as length information (L) of the MP4 format data shown in (3) of FIG. 13.

The conversion device calculates the data length (size) of each NAL unit in accordance with, for example, the processing shown in FIG. 13. That is, the conversion device calculates a data length between start codes (SCs) of an elementary stream (ES) as a data length of a single NAL unit and sets the calculated value as the length information (L) of the MP4 format data.

Note that the length calculation processing example shown in FIG. 13 is merely an example, and other methods may be applied.

For example, data in which size information of each NAL unit is recorded in advance may be separately held and this record information may be used.

5. Measure to Cope with Restriction of Data Length of TS Packet

As described above with reference to FIG. 3 and other drawings, a TS packet of the MPEG-2TS format is prescribed to have a packet size of 188 bytes.

Therefore, in order to set a start code (SC) always at the top of a payload of a TS packet in accordance with the above example, data adjustment is necessary.

This adjustment processing will be described with reference to FIG. 14.

In order to set a start code (SC) always at the top of a payload of a TS packet in accordance with the above example, a so-called adaptation field, which is a setting region of dummy data, is used.

In the case where configuration data of an MPEG-2TS is stored in a payload of a TS packet of 188 bytes without performing data adjustment, a setting position of a start code (SC) is set in various positions of the TS payload.

For example, as shown in (1) of FIG. 14, a start code (SC) is set at a position other than the top of the payload of the TS packet in some cases.

In order to prevent such a circumstance, data adjustment is performed at the time of preparation of MPEG-2TS data so that all start codes (SCs) are positioned at the top of payloads of TS packets.

For this data adjustment, an adaptation field serving as a component of a TS packet is used.

The adaptation field is configuration data of a TS packet and can be used as a storage region for dummy data having various data lengths.

Dummy data having various data lengths is stored in adaptation fields so that all start codes (SCs) are positioned at the top of payloads of TS packets.

Specifically, as shown in (2) of FIG. 14, for example, an information processing device for generating MPEG-2TS format data sets an adaptation field whose data length has been adjusted to a TS packet (P1) with respect to data having setting shown in (1) of FIG. 14. With this processing, it is possible to position a start code (SC) at the top of a payload of the next TS packet (P2).

As described above, at the time of generation of MPEG-2TS format data, the information processing device for generating MPEG-2TS format data generates a TS packet having an adaptation field whose data length has been adjusted. With this processing, MPEG-2TS format data in which all start codes (SC) are positioned at the top of payloads of TS packets is generated.

Furthermore, the following processing is performed: in the case where the top of a TS payload is a start code (SC), [1] is set to a transport priority in a TS packet header of a TS packet, and, if not, [0] is set thereto.

When MP4 conversion is performed by using the MPEG-2TS format data generated by the above processing, it is possible to perform processing according to the above example, and therefore accurate format conversion is achieved.

6. Example where Start Code (SC) Position Identification TS Packet is Set (Example 2)

Example 1 described above is an example where a value of a transport priority in a TS packet header of a TS packet of an MPEG-2TS is used as a position identifier of a start code (SC).

There will be described Example 2 that can identify a position of a start code (SC) with the use of a configuration different from the above configuration.

Figure 15:
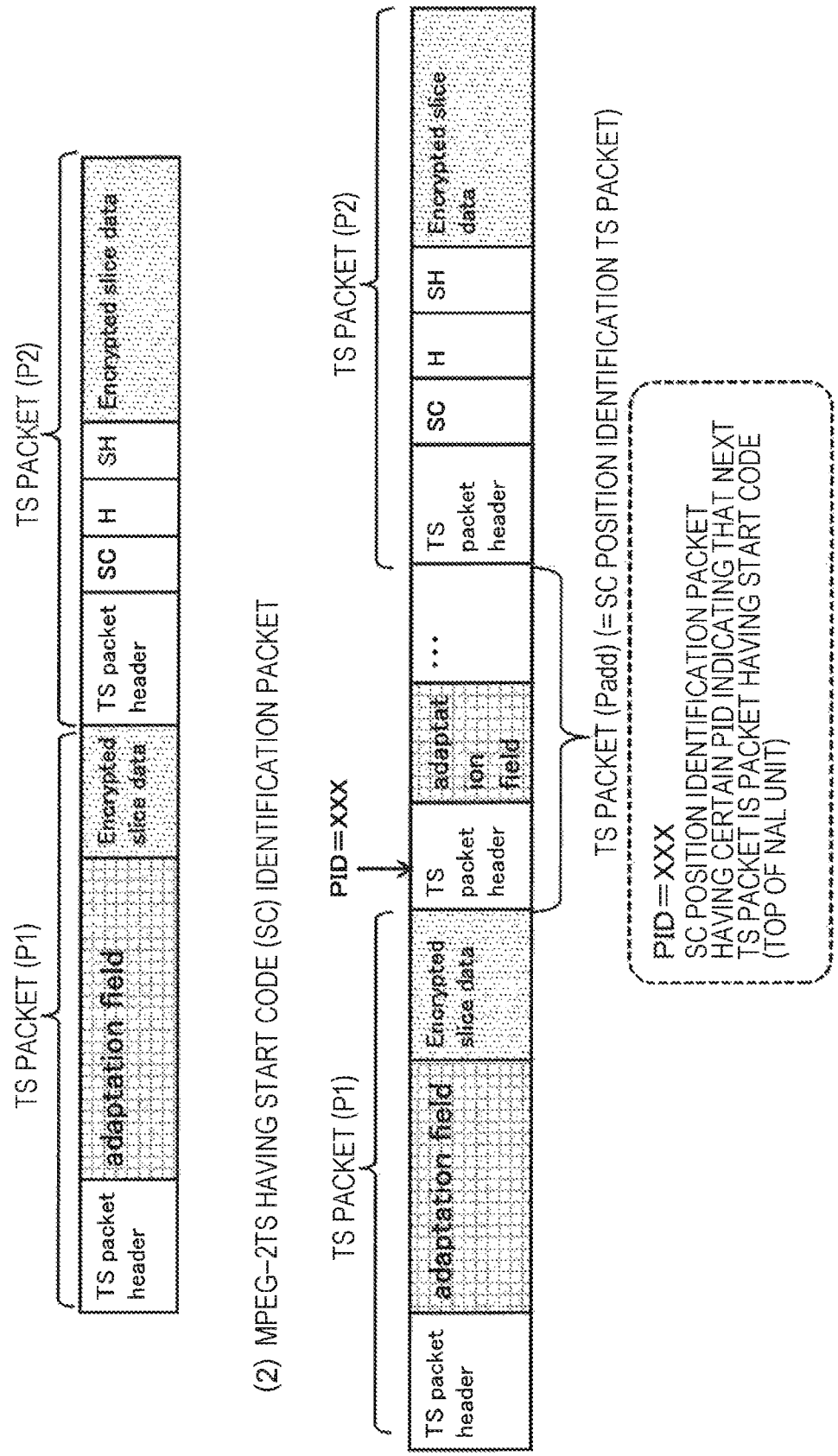
FIG. 15 is an explanatory view of an example where a start code position identification packet is set.

FIG. 15 is an explanatory view of a configuration of a TS packet in the MPEG-2TS format according to Example 2. Also in Example 2, it is possible to securely detect a position of a start code (SC) in an MPEG-2TS.

In the case where data in the MPEG-2TS format is generated, a generation device for generating MPEG-2TS format data or a recording device first adjusts a data length of an adaptation field described above with reference to FIG. 14 and generates MPEG-2TS format data in which all start codes (SCs) have been adjusted to be positioned at the top of payloads of TS packets.

This corresponds to "MPEG-2TS IN WHICH SC POSITION HAS BEEN ADJUSTED BY USING ADAPTATION FIELD" shown in (1) of FIG. 15.

Furthermore, an additional TS packet is set before a TS packet having a start code (SC) at the top of a payload in the MPEG-2TS shown in (1) of FIG. 15.

In the example shown in the drawing, a TS packet (P2) is a TS packet having a start code (SC) at the top of a payload.

An additional TS packet (Padd) is added before the TS packet (P2).

The added TS packet (Padd) may be data containing only an adaptation field serving as dummy data or may be a packet containing other certain information as a payload.

The additional TS packet (Padd) serves a start code (SC) position identification packet.

A certain program ID (PID) is set in a PID field in a TS packet header of the additional TS packet (Padd). That is, a PID based on which the packet can be determined as a start code (SC) position identification packet, for example, (PID=xxx) is set.

For example, in the case where the conversion device for executing conversion processing from MPEG-2TS to MP4 refers to a TS packet header of each TS packet forming an MPEG-2TS and detects a packet in which an identifier (PID=xxx) indicating that the packet is a start code (SC) position identification packet is set in a PID, the conversion device determines that a packet subsequent to the packet is a packet having a start code (SC) at the top of a payload.

With this configuration, the conversion device can securely extract a start code (SC) from MPEG-2TS format data and therefore can securely extract an NAL unit set subsequent to the start code.

7. Configuration Example of Information Processing Device for Performing Format Conversion A configuration example of a device for executing the processing according to the above examples will be described with reference to FIG. 16 and the following drawings.

Figure 16:
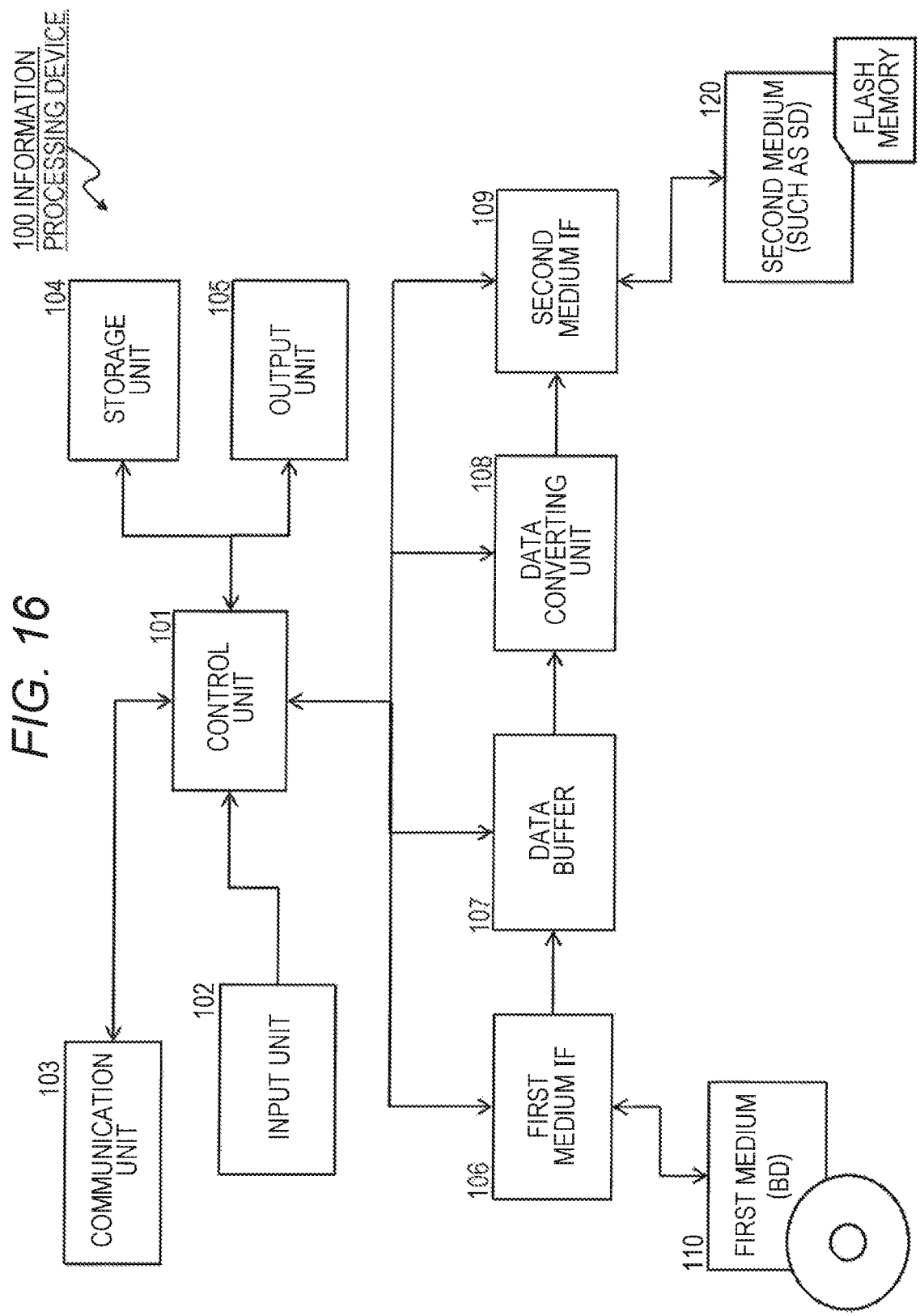
FIG. 16 is an explanatory view of a configuration example of an information processing device.

An information processing device shown in FIG. 16 is a conversion device for recording, on a second medium 120, MP4 format data generated by converting MPEG-2TS format data recorded on the first medium 110.

An information processing device 100 performs so-called copy processing in which data recorded on the first medium 110 that is an information recording medium such as a Blu-ray (registered trademark) disc (BD) is read out and is recorded on the second medium 120 that is an information recording medium such as a flash memory.

Alternatively, the information processing device performs processing in which data input via a communication unit 103 is recorded on the second medium 120 such as a flash memory.

Note that a data format of data input via the first medium 110 or the communication unit 103 is referred to as a first format, and a format of data recorded on the second medium 120 is referred to as a second format.

In the case where data in the first format input via the first medium 110 or the communication unit 103 is recorded on the second medium 120 such as a flash memory, the information processing device performs processing for converting first format data to second format data.

Note that, in the above examples, a format of data input via the first medium 110 or the communication unit 103 is the MPEG-2TS format, and a recording format of the second medium is the MP4 format.

The information processing device 100 executes format conversion from the MPEG-2TS format to the MP4 format at the time of processing of recording data on the second medium 120.

As shown in FIG. 16, the information processing device 100 includes a control unit 101, an input unit 102, the communication unit 103, a storage unit 104, an output unit 105, a first medium IF (interface) 106, a data buffer 107, a data converting unit 108, and a second medium IF 109.

The control unit 101 controls data processing executed in the information processing device 100, such as recording/reproduction of data using a medium and data copy processing between media. Such control is performed in accordance with, for example, programs stored in the storage unit 104.

The input unit 102 is an input unit that can be operated by a user, such as a switch, a button, or a touchscreen, and is an input unit for instructing/inputting various kinds of processing such as reproduction, copy, and recording.

Furthermore, the input unit 102 may include an image pickup unit and a microphone for inputting video, audio, and the like to be recorded on a medium.

The communication unit 103 communicates with, for example, an external server or external equipment and is used for various kinds of communication processing such as acquisition of record data from a medium, control information on the record data, or permission information of copy processing.

The storage unit 104 is used as a storage region for programs executed by the control unit 101, parameters for use in execution of the programs, and the like and is further used as a working region at the time of execution of the programs.

Specifically, the storage unit is also used as a region for temporarily storing data read out from the first medium 110 or data input via the communication unit 103 at the time of recording the data on the second medium 120.

The storage unit 104 includes, for example, a RAM, a ROM, or the like.

The output unit 105 includes an output unit to an external device or an output unit of reproduction data from a medium. For example, the output unit is used for, for example, displaying a state of progress of processing of recording data on the second medium 120 or displaying a message to a user and includes a display, a speaker, and the like.

The first medium interface (IF) 106 is an interface functioning as a data recording/reproducing unit that accesses the first medium 110 such as a Blu-ray (registered trademark) disc (BD) to record data on the first medium 110 and read data therefrom.

The data buffer 107 is a buffer for temporarily storing data read out from the first medium 110 or data input via the communication unit 103. For example, the data buffer temporarily stores data to be recorded on the second medium 120.

The data converting unit 108 executes format conversion processing for converting data in the first format, which is a format of data recorded on the first medium 110 or data input via the communication unit 103, to the second format, which is a data format used when the data is recorded on the second medium 120 serving as a destination on which the data is recorded.

The second medium interface (IF) 109 is an interface functioning as a data recording/reproducing unit that accesses the second medium 120 to perform data recording or reading processing on the second medium 120.

As described above, the information processing device 100 performs processing of recording data in the first format input via the first medium 110 or the communication unit 103 on the second medium 120 such as a flash memory. At the time of this processing, processing for converting first format data to second format data is performed.

Note that the first format is, for example, MPEG-2TS format data, and the second format is MP4 format data.

Note that the information processing device 100 may perform processing in which only data that cannot be acquired from the first medium 110 is acquired from an external server via the communication unit 103 and read data from the first medium 110 and the received data acquired via the communication unit 103 are recorded together on the second medium 120.

Furthermore, in the configuration shown in FIG. 16, the first medium 110 is, for example, a Blu-ray (registered trademark) disc (BD). The second medium 120 is a flash memory such as an SD card.

Note that the first medium 110 and the second medium 120 are not limited to the above combination, and various combinations may be used.

A detailed configuration of the data converting unit 108 will be described with reference to FIG. 17.

Figure 17:
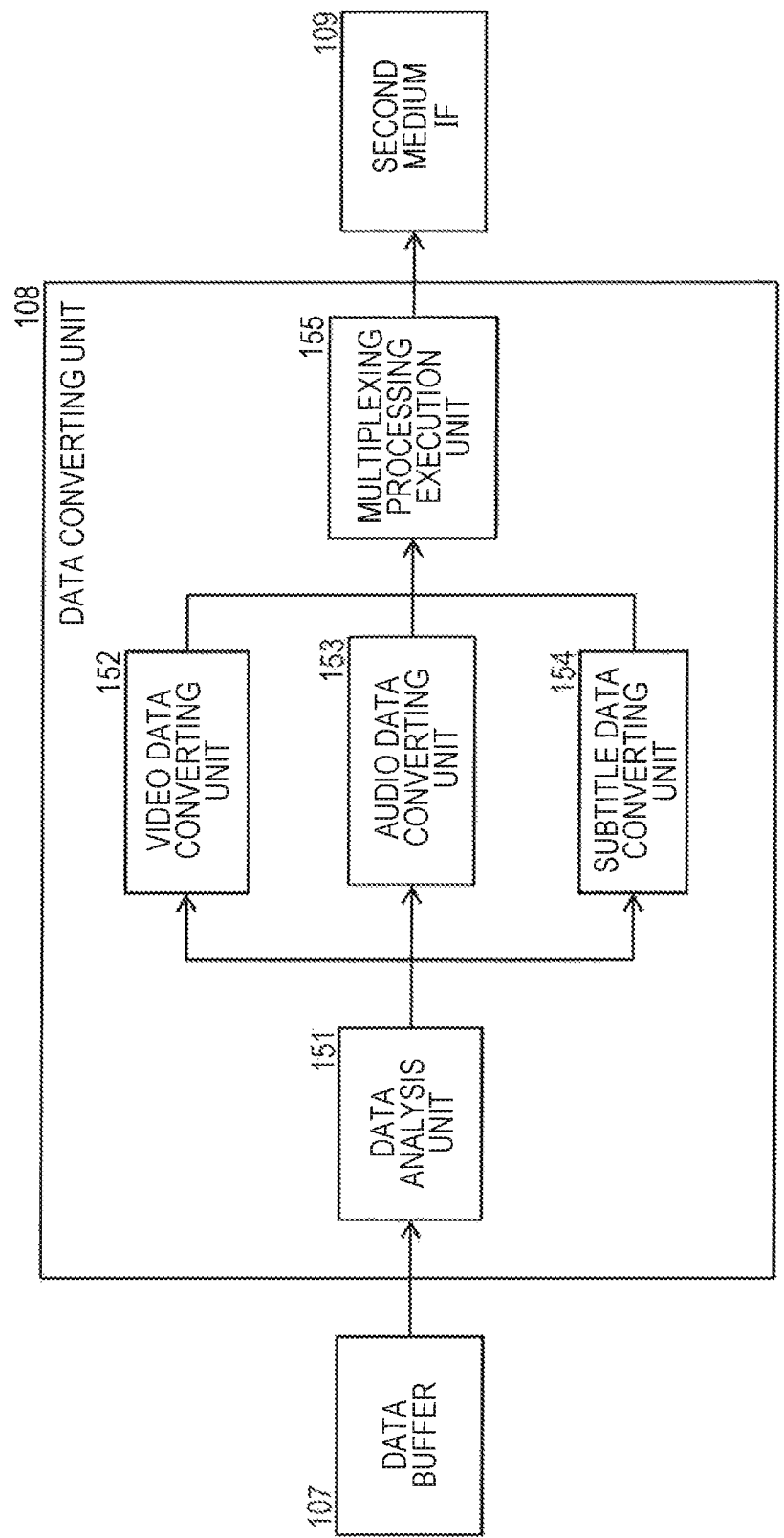
FIG. 17 is an explanatory view of a configuration of a data converting unit of an information processing device.

As shown in FIG. 17, the data converting unit 108 includes a data analysis unit 151, a video data converting unit 152, an audio data converting unit 153, a subtitle data converting unit 154, and a multiplexing processing execution unit 155.

On the basis of an identifier (PID: program ID) which is set in data readout from the first medium 110 or data (packet) input via the communication unit 103, which is stored in the data buffer 107, the data analysis unit 151 classifies the data (packet) into the following three types of data:

video data;
audio data; and
subtitle data.

The data analysis unit 151 outputs video data to the video data converting unit 152, outputs audio data to the audio data converting unit 153, and outputs subtitle data to the subtitle data converting unit 154.

The video data converting unit 152, the audio data converting unit 153, and the subtitle data converting unit 154 execute processing for converting the first format that is a data format of input data, for example, MPEG-2TS format data to the second format to be recorded on the second medium 120, specifically, for example, format data in the MP4 format.

That is, the video data converting unit 152 generates video data in the MP4 format that is a data recording format for the second medium 120 and outputs the video data to the multiplexing processing execution unit 155.

The audio data converting unit 153 generates audio data in the MP4 format and outputs the audio data to the multiplexing processing execution unit 155.

The subtitle data converting unit 154 generates subtitle data in the MP4 format and outputs the subtitle data to the multiplexing processing execution unit 155.

The multiplexing processing unit 155 executes multiplexing processing of, for example, the following data:

(a) video format data in the second format (MP4) generated by the video data generation unit 152;
(b) audio format data in the second format (MP4) generated by the audio data generation unit 153;
(c) subtitle format data in the second format (MP4) generated by the subtitle data generation unit 154; and
(d) data extracted from, for example, a reproduction control information file stored in the storage unit 104, and generates record data in the second format (MP4).

The data generated by the multiplexing processing execution unit 155 is recorded on the second medium 120 via the second medium interface 109.

As described above, the information processing device 100 executes processing for converting data recorded on the first medium 110 or data in the first format (MPEG-2TSV format) input via the communication unit 103 to the second format (MP4) that is a recording format of the second medium 120 and recording the data on the second medium 120.

Note that the video data converting unit 152 executes start code (SC) detection processing according to the above examples with respect to a TS packet corresponding to video data detected on the basis of a PID by the data analysis unit 151.

Specifically, the video data converting unit 152 determines whether or not the top of a payload of each TS packet is a start code (SC) with reference to a value of a transport priority set in a TS packet header of the TS packet.

Furthermore, the video data converting unit 152 performs processing of extracting a NAL unit subsequent to each start code (SC) to set the NAL unit as configuration data of MP4 format data and calculating or acquiring a size of the NAL unit to set the size as length information (L) of the MP4 format data.

Note that, in the case where the processing according to Example 2 described above with reference to FIG. 15 is performed, the video data converting unit 152 detects an SC position identification packet from a TS packet in an MPEG-2TS on the basis of, for example, setting of a PID.

The video data converting unit 152 determines that the top of a payload of a TS packet subsequent to the detected SC position identification packet is an SC and executes conversion processing to the MP4 format.

Figure 18:
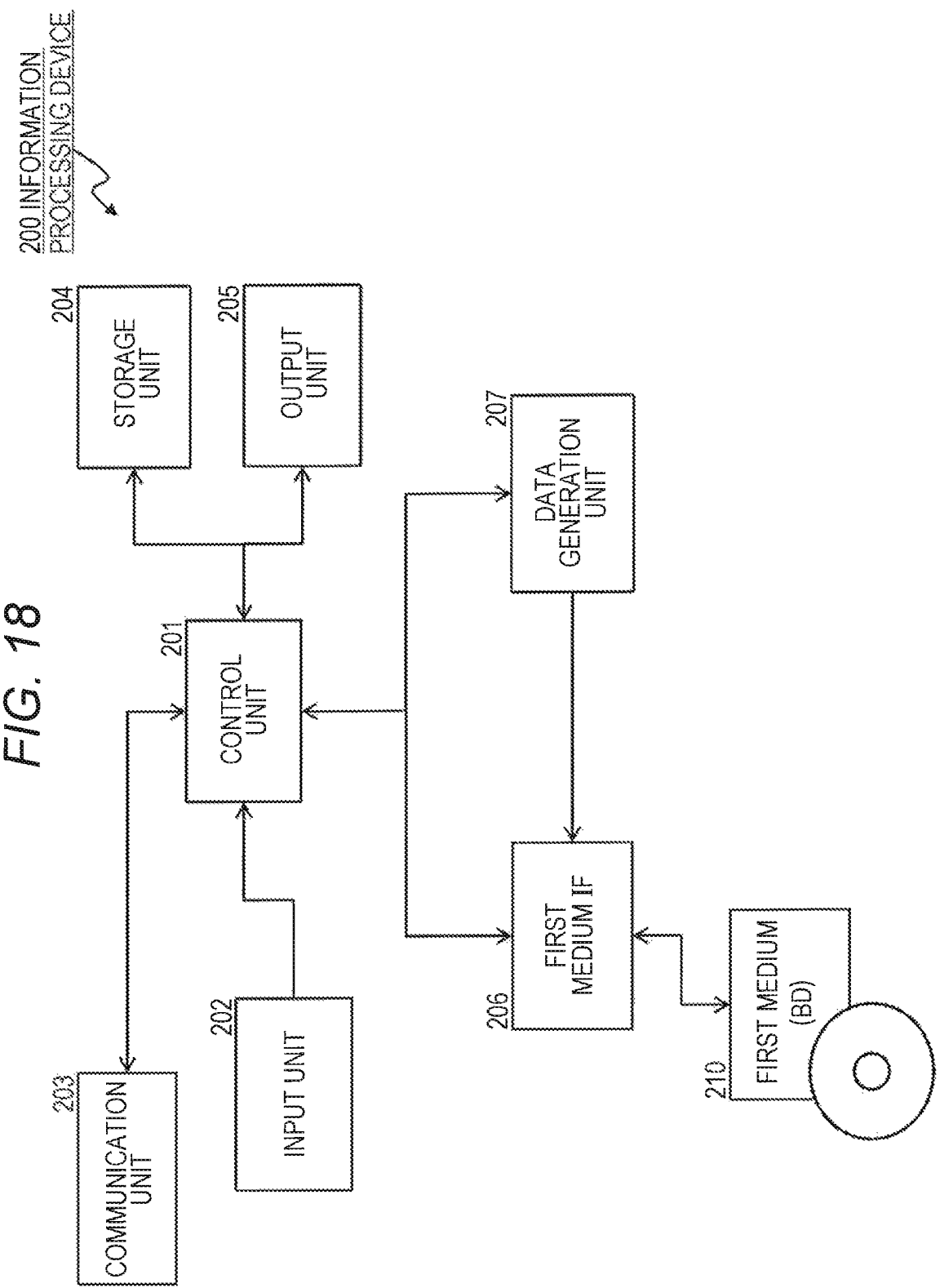
FIG. 18 is an explanatory view of a configuration example of an information processing device.

8. Configuration Example of Information Processing Device for Performing Data Generation or Recording Processing An information processing device shown in FIG. 18 is a device for generating MPEG-2TS format data according to the above examples. The generated data is recorded on a first medium 210. Alternatively, the generated data is output to the outside via an output unit 205 or a communication unit 203.

As shown in FIG. 18, an information processing device 200 includes a control unit 201, an input unit 202, the communication unit 203, a storage unit 204, the output unit 205, a first medium IF (interface) 206, and a data generation unit 207.

The control unit 201 controls data processing executed in the information processing device 200, such as data recording/reproduction processing using a medium. Such control is performed in accordance with, for example, programs stored in the storage unit 204.

The input unit 202 is an input unit that can be operated by a user, such as a switch, a button, or a touchscreen, and is an input unit for instructing/inputting various kinds of processing such as reproduction, copy, and recording.

Furthermore, the input unit 202 may include an image pickup unit and a microphone for inputting video, audio, and the like to be recorded on a medium.

The communication unit 203 communicates with, for example, an external server or external equipment and is used for various kinds of communication processing such as acquisition of record data from a medium, control information on the record data, or permission information of copy processing.

The storage unit 204 is used as a storage region for programs executed by the control unit 201, parameters for use in execution of the programs, and the like and is further used as a working region at the time of execution of the programs.

Specifically, the storage unit is also used as a region for temporarily storing data to be recorded on the first medium 210 or data input via the communication unit 203.

The storage unit 204 includes, for example, a PAM, a ROM, or the like.

The output unit 205 includes a display, a speaker, and the like serving as an output unit to an external device and an output unit of reproduction data from the first medium 210.

The first medium interface (IF) 206 is an interface functioning as a data recording/reproducing unit that accesses the first medium 210 such as a Blu-ray (registered trademark) disc (BD) to record data on the first medium 210 and read data therefrom.

The data generation unit 207 generates MPEG-2TS format data.

In this data generation, MPEG-2TS format data including TS packets having a data configuration according to the above examples is generated.

Specifically, all start codes (SC) are set to be positioned at the top of payloads of the TS packets, and a value of a transport priority in a header of a TS packet in which the top of a payload is a start code (SC) is set to [1]. Furthermore, a value of a transport priority in a header of a TS packet in which the top of a payload is not a start code (SC) is set to [0].

Note that, in the case where the processing according to Example 2 described above with reference to FIG. 15 is performed, the data generation unit 207 performs processing of adding a start code (SC) position identification packet before a TS packet in which the top of a payload is a start code (SC) in an MPEG-2TS.

A PID of this additional TS packet is a certain PID based on which the packet can be identified as a start code (SC) position identification packet.

The MPEG-2TS format data generated by the data generation unit 207 is recorded on the first medium 210. Alternatively, the MPEG-2TS format data is output to the outside via the communication unit 203 or the output unit 205.

9. Sequences of Format Conversion Processing

Processing sequences executed by a conversion device for executing conversion processing from the MPEG-2TS format to the MP4 format will be described with reference to flowcharts shown in FIG. 19 and FIG. 20.

Figure 19:
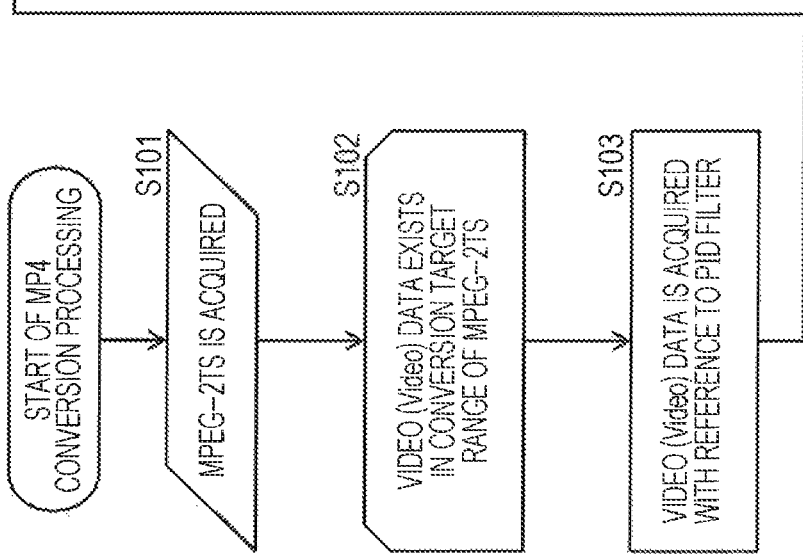
FIG. 19 is a flowchart showing a sequence of data conversion processing executed by an information processing device.

The processing according to flows shown in FIG. 19 and FIG. 20 is processing executed in the data converting unit 108 shown in FIG. 17.

The data converting unit 108 executes processing according to the flow shown in FIG. 19 or FIG. 20 in accordance with, for example, a program stored in the storage unit.

The flow shown in FIG. 19 is a processing flow performed at the time of processing of determining whether or not the top of a payload of each TS packet is a start code (SC) with reference to a value of a transport priority set in a TS packet header of the TS packet.

FIG. 20 shows a flow performed at the time of the processing according to Example 2 described above with reference to FIG. 15 and is a processing flow performed at the time of processing of detecting an SC position identification packet from a TS packet in an MPEG-2TS on the basis of, for example, setting of a PID.

A processing sequence according to the flow shown in FIG. 19 will be described.

(Step S101)

In step S101, MPEG-2TS format data containing data to be converted is input.

The MPEG-2TS format data is input via, for example, a medium such as a BD or the communication unit.

(Step S102)

Processing in steps S102 to S108 is repeatedly executed until video data to be converted no longer exists in the input MPEG-2TS format data.

In step S102, processing of determining whether or not video data to be converted exists in the input MPEG-2TS format data is executed. In the case where the video data exists, the processing proceeds to step S103. In the case where the video data does not exist, the processing is terminated.

(Step S103)

In step S103, the data analysis unit 151 sorts out only a TS packet storing data corresponding to the video data on the basis of a PID set in a header of the TS packet and outputs the TS packet to the video data converting unit 152.

(Step S104)

In step S104, the video data converting unit 152 determines whether or not a value of a transport priority in the header of the TS packet is [1].

In the case where the value is [1], the processing proceeds to step S105. On the contrary, in the case where the value is [0], the processing proceeds to step S106.

(Step S105)

In the case where it is determined in step S104 that the value of the transport priority in the header of the TS packet is [1], the processing proceeds to step S105.

In step S105, the video data converting unit 152 performs processing of the TS packet in which the value of the transport priority of the header of the TS packet is determined as [1].

The video data converting unit 152 determines that the top of a payload of the TS packet is a start code (SC), determines that payload data subsequent to the SC is NAL unit configuration data, acquires this NAL unit, and performs conversion processing to configuration data of MP4 format data.

(Step S106)

In the case where it is determined in step S104 that the value of the transport priority in the header of the TS packet is [0], the processing proceeds to step S106.

In step S106, processing is performed on the TS packet in which the value of the transport priority in the header of the TS packet is determined as [0].

The video data converting unit 152 determines that a start code (SC) is not included in the top of a payload of the TS packet, determines that payload data is NAL unit configuration data, acquires this NAL unit, and performs conversion processing to configuration data of the MP4 format data.

(Step S107)

The next processing is processing executed by the multiplexing processing unit 155, and multiplexing processing of the converted data of the video data in step S105 or step S106 with other data is executed.

(Step S108)

In step S108, the video data subjected to the conversion processing is excluded from the data to be converted.

In the case where video data to be converted remains, the processing in step S102 and the following steps is repeated.

In the case where it is determined that no data to be converted remains, the processing proceeds to step S109.

(Step S109)

In step S109, the generated MP4 format data is output. The generated MP4 format data is recorded on a medium or is output to the outside via the communication unit or the output unit.

A processing sequence performed at the time of the processing according to Example 2 described above with reference to FIG. 15 will be described with reference to the flowchart shown in FIG. 20.

This processing is processing performed at the time of processing of detecting an SC position identification packet from a TS packet in an MPEG-2TS on the basis of, for example, setting of a PID.

(Step S201)

In step S201, MPEG-2TS format data containing data to be converted is input.

The MPEG-2TS format data is input via, for example, a medium or the communication unit.

(Step S202)

Processing in steps S202 to S208 is repeatedly executed until video data to be converted no longer exists in the input MPEG-2TS format data.

In step S202, processing of determining whether or not video data to be converted exists in the input MPEG-2TS format data is executed. In the case where the video data exists, the processing proceeds to step S203. In the case where the video data does not exist, the processing is terminated.

(Step S203)

In step S203, the data analysis unit 151 sorts out only a TS packet storing data corresponding to the video data on the basis of a PID set in a header of the TS packet and outputs the TS packet to the video data converting unit 152.

(Step S204)

In step S204, the video data converting unit 152 determines whether or not a PID indicating that a packet is a start code (SC) position identification packet is set in the header of the TS packet.

In the case where the PID is set, the processing proceeds to step S205. In the case where the PID is not set, the processing proceeds to step S206.

(Step S205)

In the case where it is determined in step S204 that the PID indicating that the packet is a start code (SC) position identification packet is set in the header of the TS packet, the processing proceeds to step S205.

In step S205, the video data converting unit 152 acquires a TS packet subsequent to the packet in which the PID indicating that the packet is a start code (SC) position identification packet is set in the header of the TS packet and determines that the top of a payload of the acquired TS packet is a start code (SC).

Furthermore, the video data converting unit 152 determines that payload data subsequent to the SC of the acquired TS packet is NAL unit configuration data, acquires the NAL unit, and performs conversion processing to configuration data of MP4 format data.

(Step S206)

In the case where it is determined in step S204 that the PID indicating that the packet is a start code (SC) position identification packet is not set in the header of the TS packet, the processing proceeds to step S206.

In step S206, the video data converting unit 152 acquires a TS packet subsequent to the packet in which the PID indicating that the packet is a start code (SC) position identification packet is not set in the header of the TS packet and performs processing of the acquired TS packet.

The video data converting unit 152 determines that payload data of the acquired TS packet is NAL unit configuration data, acquires the NAL unit, and performs conversion processing to configuration data of the MP4 format data.

(Step S207)

The next processing is processing executed by the multiplexing processing unit 155, and multiplexing processing of the converted data of the video data in step S205 or step S206 with other data is executed.

(Step S208)

In step S208, the video data subjected to the conversion processing is excluded from the data to be converted.

In the case where video data to be converted remains, the processing in step S202 and the following steps is repeated.

In the case where it is determined that no data to be converted remains, the processing proceeds to step S209.

(Step S209)

In step S209, the generated MP4 format data is output. The generated MP4 format data is recorded on a medium or is output to the outside via the communication unit or the output unit.

10. Other Examples

In the above examples, there has been described an example where a position of a start code (SC) in MPEG-2TS format data can be determined on the basis of data in a TS packet header of a TS packet, specifically, a transport priority or a setting value of a PID.

The position of the start code (SC) in the MPEG-2TS format data may be identified by using other data in the header.

Furthermore, map information in which a position of a start code (SC) in MPEG-2TS format data is recorded may be set as metadata corresponding to the MPEG-2TS format data and be recorded together on an information recording medium or be transmitted together via the communication unit.

For example, the conversion device can receive map information in which a position of a start code (SC) in MPEG-2TS format data is recorded from a server via the communication unit, determine the position of the start code with the use of this map information, and perform format conversion.

Furthermore, in the above examples, a case of encrypted video data has been described. However, the processing of the present disclosure is also applicable to a TS packet in which non-encrypted data is stored as a payload.

Furthermore, in the above examples, there has been described a conversion processing example of AVC or HEVC encoded video data as an example of encoded data allowed to be stored in both the MPEG-2TS format and the MP4 format. However, the processing of the present disclosure is also applicable to encoded data other than AVC or HEVC encoded data.

11. Overview of Configurations of Present Disclosure

From the above, examples of the present disclosure have been described in detail with reference to certain examples. However, it is obvious that a person skilled in the art can make modification and substitution of the examples without departing from the scope of the present disclosure. That is, the present invention has been disclosed in an exemplary manner and should not be interpreted in a limited manner. CLAIMS should be referred to for determining the scope of the present disclosure.

Note that a technique disclosed in this specification can have the following configurations.

(1) An information processing device, including
a data converting unit configured to execute format conversion from an MPEG-2TS format to an MP4 format, wherein
the data converting unit includes
a data analysis unit configured to sort out TS packets storing video data from MPEG-2TS format data, and
a video data converting unit configured to execute processing of selecting a TS packet having a start code (SC) at a top of a payload on the basis of header information of the TS packets sorted out in the data analysis unit, extracting payload configuration data other than the start code (SC), and setting the payload configuration data as configuration data of MP4 format data.

(2) The information processing device according to (1), wherein
the video data converting unit determines, on the basis of a value of a transport priority set in a header of the TS packet, whether or not the TS packet is a TS packet in which a start code (SC) is set in a top region of a payload.

(3) The information processing device according to (1) or (2), wherein
in a case of a TS packet in which a start code (SC) is set in a top region of a payload, the video data converting unit extracts payload configuration data subsequent to the start code (SC),
in a case of a TS packet in which a start code (SC) is not set in a top region of a payload, the video data converting unit extracts payload configuration data from the top of the payload, and
the video data converting unit sets the extracted payload configuration data as the configuration data of the MP4 format data.

(4) The information processing device according to (1) to (3), wherein
the video data stored in the MPEG-2TS format is any one of AVC encoded data and HEVC encoded data.

(5) The information processing device according to (1) to (4), wherein
the video data converting unit executes processing of extracting a NAL unit that is the payload configuration data other than the start code (SC) in the payload of the TS packet and setting the NAL unit as the configuration data of the MP4 format data.

(6) The information processing device according to (1) to (5), wherein
the video data converting unit extracts a NAL unit that is the payload configuration data other than the start code (SC) in the payload of the TS packet and stores the extracted NAL unit at a position subsequent to a length information setting section of the MP4 format data.

(7) The information processing device according to (1) to (6), wherein
the video data converting unit extracts a NAL unit that is the payload configuration data other than the start code (SC) in the payload of the TS packet, calculates a data length of the NAL unit between start codes, and stores the calculated data length in length information of the MP4 format data.

(8) The information processing device according to (1) to (7), wherein
the data converting unit includes a multiplexing processing execution unit configured to execute multiplexing processing of MP4 format data corresponding to video data generated by the video data converting unit with MP4 format data of data other than video.

(9) The information processing device according to (1)= (8), wherein
the data converting unit executes conversion processing of the MPEG-2TS format data read out from a disk recorded in a BDMV format.

(10) The information processing device according to (1) to (9), wherein
the data converting unit executes conversion processing of the MPEG-2TS format data input from an outside via a communication unit.

(11) The information processing device according to (1) to (10), wherein
the video data converting unit determines, on the basis of a value of a PID set in a header of the TS packet, whether or not a subsequent TS packet is a TS packet in which a start code (SC) is set in a top region of a payload.

(12) An information generation device, including
a data generation unit configured to generate MPEG-2TS format data, wherein
the data generation unit generates a TS packet in which start code position identification information indicating whether or not the packet is a packet having a start code (SC) at a top of a TS payload is recorded as header information of the TS packet storing video data.

(13) The information generation device according to (12), wherein
the data generation unit generates the TS packet while executing data adjustment so that each start code (SC stored in a payload of the TS packet storing the video data is positioned at the top of the TS payload.

(14) The information generation device according to (12) or (13), wherein
the data generation unit generates the TS packet so that whether or not the packet is a packet having a start code (SC) at the top of the TS payload is determined on the basis of a value of a transport priority in a TS packet header.

(15) The information generation device according to (12) to (14), wherein
the information generation device includes
a recording unit configured to record the MPEG-2TS format data generated by the data generation unit on an information recording medium.

(16) An information recording medium on which MPEG-2TS format data is recorded as data to be reproduced, wherein:
a TS packet, in which start code position identification information indicating whether or not the packet is a packet having a start code (SC) at a top of a TS payload is recorded as header information of the TS packet storing video data, is recorded; and
an information processing device configured to execute format conversion of storage data in the information recording medium analyzes the header information of the TS packet to determine a position of a start code (SC) and performs format conversion based on a result of the determination.

(17) An information processing method for executing data format conversion in an information processing device, wherein:

the information processing device includes a data converting unit configured to execute format conversion from an MPEG-2TS format to an MP4 format; and the data converting unit executes processing of sorting out TS packets storing video data from MPEG-2TS format data, selecting a TS packet having a start code (SC) at a top of a payload on the basis of header information of the sorted out TS packets, and extracting payload configuration data other than the start code (SC) and setting the payload configuration data as configuration data of MP4 format data.

(18) An information processing method for executing data generation processing in an information processing device, wherein:

the information processing device includes a data generation unit configured to generate MPEG-2TS format data; and the data generation unit generates a TS packet in which start code position identification information indicating whether or not the packet is a packet having a start code (SC) at a top of a TS payload is recorded as header information of the TS packet storing video data.

(19) A program causing an information processing device to execute data format conversion, the information processing device including a data converting unit configured to execute format conversion from an MPEG-2TS format to an MP4 format, wherein the program causes the data converting unit to execute processing of sorting out TS packets storing video data from MPEG-2TS format data, processing of selecting a TS packet having a start code (SC) at a top of a payload on the basis of header information of the sorted out TS packets, and processing of extracting payload configuration data other than the start code (SC) and setting the payload configuration data as configuration data of MP4 format data.

(20) A program causing an information processing device to execute data generation processing, the information processing device including a data generation unit configured to generate MPEG-2TS format data, wherein the program causes the data generation unit to generate a TS packet in which start code position identification information indicating whether or not the packet is a packet having a start code (SC) at a top of a TS payload is recorded as header information of the TS packet storing video data.

Furthermore, a series of processing described in the specification can be executed with hardware, software, or a combination thereof. In the case where processing with software is executed, the processing can be executed by installing a program in which a processing sequence is recorded on a memory inside a computer incorporated in dedicated hardware or can be executed by installing the program on a general-purpose computer capable of executing various types of processing. For example, the program can be recorded on a recording medium in advance. The program can be installed on a computer from the recording medium, or the program can be received via a network such as a LAN (Local Area Network) or the Internet and be installed on a recording medium such as a hard disk included therein.

Note that the various types of processing described in the specification may not only be executed in time series according to the order of the description but also be executed in parallel or individually depending on a throughput of a device that executes the processing or as necessary. Furthermore, the term "system" in this specification is a configuration of a logical set of a plurality of devices and is not limited to a configuration in which devices having respective configurations are provided in the same housing.

INDUSTRIAL APPLICABILITY

As described above, according to a configuration of an example in the present disclosure, it is possible to accurately and securely execute conversion from an MPEG-2TS format to an MP4 format.

Specifically, a data converting unit that executes format conversion from an MPEG-2TS format to an MP4 format sorts out TS packets storing video data from MPEG-2TS format data, selects a TS packet having a start code (SC) at the top of a payload on the basis of header information of the sorted out TS packets, and extracts payload configuration data other than the start code (SC) and sets the payload configuration data as configuration data of MP4 format data. The data converting unit determines, on the basis of, for example, a value of a transport priority set in a header of the TS packet, whether or not the TS packet is a TS packet in which a start code (SC) is set in a top region of a payload.

With this configuration, it is possible to accurately and securely execute conversion from the MPEG-2TS format to the MP4 format.

REFERENCE SIGNS LIST

100 Information processing device
101 Control unit
102 Input unit
103 Communication unit
104 Storage unit
105 Output unit
106 First medium interface
107 Data buffer
108 Data converting unit
109 Second medium interface
110 First medium
120 Second medium
151 Data analysis unit
152 Video data converting unit
153 Audio data converting unit
154 Subtitle data converting unit
155 Multiplexing processing unit
200 Information processing device
201 Control unit
202 Input unit
203 Communication unit
204 Storage unit
205 Output unit
206 First medium interface
207 Data generation unit

The invention claimed is:

1. An information processing device, comprising:
a data converting unit configured to execute format conversion from an MPEG-2TS format to an MP4 format, wherein the data converting unit includes
a data analysis unit configured to sort out a plurality of TS packets storing video data from MPEG-2TS format data, and
a video data converting unit configured to execute processing of selecting each TS packet having a start code (SC) at a top of a payload on the basis of header information of the plurality of TS packets sorted out in the data analysis unit, extracting payload configuration data other than the start code (SC) from each selected TS packet, and setting the payload configuration data as configuration data of MP4 format data for each selected TS packet, wherein the video data converting unit determines whether or not each respective TS packet includes the start code (SC) at the top of the payload on the basis of a value of a respective transport priority set in the header information of the respective TS packet, wherein the video data converting unit determines that the start code (SC) is included at the top of the payload when the transport priority is 1, and that the start code (SC) is not included at the top of the payload when the transport priority is 0, and wherein the data analysis unit and the video data converting unit are each implemented via at least one processor.

2. The information processing device according to claim 1, wherein in a case of a TS packet in which the start code (SC) is set at the top of the payload, the video data converting unit extracts the payload configuration data subsequent to the start code (SC), in a case of a TS packet in which the start code (SC) is not set at the top region of the payload, the video data converting unit extracts the payload configuration data from the top of the payload, and the video data converting unit sets the extracted payload configuration data as the configuration data of the MP4 format data.

3. The information processing device according to claim 1, wherein the video data stored in the MPEG-2TS format is any one of AVC encoded data and HEVC encoded data.

4. The information processing device according to claim 1, wherein the video data converting unit executes processing of extracting a NAL unit that is the payload configuration data other than the start code (SC) in the payload of the TS packet and setting the NAL unit as the configuration data of the MP4 format data.

5. The information processing device according to claim 1, wherein the video data converting unit extracts a NAL unit that is the payload configuration data other than the start code (SC) in the payload of the TS packet and stores the extracted NAL unit at a position subsequent to a length information setting section of the MP4 format data.

6. The information processing device according to claim 1, wherein the video data converting unit extracts a NAL unit that is the payload configuration data other than the start code (SC) in the payload of the TS packet, calculates a data length of the NAL unit between start codes, and stores the calculated data length in length information of the MP4 format data.

7. The information processing device according to claim 1, wherein the data converting unit includes a multiplexing processing execution unit configured to execute multiplexing processing of MP4 format data corresponding to video data generated by the video data converting unit with MP4 format data of data other than video.

8. The information processing device according to claim 1, wherein the data converting unit executes conversion processing of the MPEG-2TS format data read out from a disk recorded in a BDMV format.

9. The information processing device according to claim 1, wherein the data converting unit executes conversion processing of the MPEG-2TS format data input from an outside via a communication unit.

10. The information processing device according to claim 1, wherein the video data converting unit determines, on the basis of a value of a PID set in the header information of the TS packet, whether or not a subsequent TS packet is a TS packet in which the start code (SC) is set at the top of the payload.

11. An information generation device, comprising:

a data generation unit configured to generate MPEG-2TS format data, wherein the data generation unit generates a plurality of TS packets in which start code position identification information of each respective TS packet indicates whether or not the respective TS packet includes a start code (SC) at a top of a TS payload is recorded as a transport priority in header information of the respective TS packet storing video data, wherein the start code position identification information indicates that the start code (SC) is included at the top of the payload when the transport priority is 1, and that the start code (SC) is not included at the top of the payload when the transport priority is 0 and wherein the data generation unit is implemented via at least one processor.

12. The information generation device according to claim 11, wherein the data generation unit generates the TS packet while executing data adjustment so that each start code (SC) stored in the payload of the respective TS packet storing the video data is positioned at the top of the TS payload.

13. The information generation device according to claim 11, wherein the information generation device further comprises:

a recording unit configured to record the MPEG-2TS format data generated by the data generation unit on an information recording medium, wherein the recording unit is implemented via at least one processor.

14. A non-transitory computer-readable information recording medium having embodied thereon a program, which when executed by at least one processor of an information processing device causes the information processing device to execute a method, the method comprising:

recording MPEG-2TS format data as data to be reproduced, wherein the recorded data comprises a plurality of TS packets, in which start code position identification information indicating whether or not each TS packet includes a start code (SC) at a top of a TS payload is recorded as a transport priority in header information of the TS packet storing video data;

analyzing the header information of each TS packet to determine a position of each start code (SC); and performing format conversion of storage data in the information recording medium based on a result of the determination, wherein the start code position identification information indicates that the start code (SC) is included at the top of the payload when the transport priority is 1, and that the start code (SC) is not included at the top of the payload when the transport priority is 0.

15. An information processing method for executing data format conversion in an information processing device,
wherein the information processing device includes a data converting unit configured to execute format conversion from an MPEG-2TS format to an MP4 format, and
wherein the data converting unit executes processing of
sorting out a plurality of TS packets storing video data from MPEG-2TS format data,
selecting each TS packet having a start code (SC) at a top of a payload on the basis of header information of the plurality of sorted out TS packets, and
extracting payload configuration data other than the start code (SC) from each selected TS packet and setting the payload configuration data as configuration data of MP4 format data for each selected TS packet,
wherein the data converting unit determines whether or not each respective TS packet includes the start code (SC) at the top of the payload on the basis of a value of a respective transport priority set in the header information of the respective TS packet,
wherein the data converting unit determines that the start code (SC) is included at the top of the payload when the transport priority is 1, and that the start code (SC) is not included at the top of the payload when the transport priority is 0, and
wherein the data converting unit is implemented via at least one processor.

16. An information processing method for executing data generation processing in an information processing device,
wherein the information processing device includes a data generation unit configured to generate MPEG-2TS format data,
wherein the data generation unit generates a plurality of TS packets in which start code position identification information of each respective TS packet indicates whether or not the respective TS packet includes a start code (SC) at a top of a TS payload is recorded as a transport priority in header information of the respective TS packet storing video data,
wherein the start code position identification information indicates that the start code (SC) is included at the top of the payload when the transport priority is 1, and that the start code (SC) is not included at the top of the payload when the transport priority is 0 and
wherein the data generation unit is implemented via at least one processor.

17. A non-transitory computer-readable storage medium having embodied thereon a program, which when executed by at least one processor of an information processing device causes the information processing device to execute data format conversion,
wherein the information processing device includes a data converting unit configured to execute the data format conversion from an MPEG-2TS format to an MP4 format,
wherein the program causes the data converting unit to execute a method comprising:
processing of sorting out a plurality of TS packets storing video data from MPEG-2TS format data,
processing of selecting each TS packet having a start code (SC) at a top of a payload on the basis of header information of the plurality of sorted out TS packets, and
processing of extracting payload configuration data other than the start code (SC) from each selected TS packet and setting the payload configuration data as configuration data of MP4 format data for each selected TS packet,
wherein the data converting unit determines whether or not each respective TS packet includes the start code (SC) at the top of the payload on the basis of a value of a respective transport priority set in the header information of the respective TS packet, and
wherein the data converting unit determines that the start code (SC) is included at the top of the payload when the transport priority is 1, and that the start code (SC) is not included at the top of the payload when the transport priority is 0.

18. A non-transitory computer-readable storage medium having embodied thereon a program, which when executed by at least one processor of an information processing device causes the information processing device to execute a method of data generation processing, the method comprising:
generating MPEG-2TS format data; and
generating a plurality of TS packets in which start code position identification information of each respective TS packet indicates whether or not the respective TS packet includes a start code (SC) at a top of a TS payload is recorded a transport priority in as header information of the respective TS packet storing video data,
wherein the start code position identification information indicates that the start code (SC) is included at the top of the payload when the transport priority is 1, and that the start code (SC) is not included at the top of the payload when the transport priority is 0.

* * * * *